United States Patent
Cao et al.

(10) Patent No.: US 11,671,210 B2
(45) Date of Patent: Jun. 6, 2023

(54) RETRANSMISSION CONTROL METHOD, COMMUNICATIONS INTERFACE, AND ELECTRONIC DEVICE

(71) Applicant: HUAWEI TECHNOLOGIES CO., LTD., Guangdong (CN)

(72) Inventors: Zhen Cao, Beijing (CN); Kai Zheng, Beijing (CN); Ilpo Jarvinen, Helsinki (FI); Markku Kojo, Helsinki (FI)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 87 days.

(21) Appl. No.: 17/138,321

(22) Filed: Dec. 30, 2020

(65) Prior Publication Data

US 2021/0126741 A1 Apr. 29, 2021

Related U.S. Application Data

(63) Continuation of application No. PCT/CN2019/081718, filed on Apr. 8, 2019.

(30) Foreign Application Priority Data

Jul. 2, 2018 (CN) .......................... 201810710158.6

(51) Int. Cl.
*H04L 1/18* (2023.01)
*H04L 5/00* (2006.01)
(Continued)

(52) U.S. Cl.
CPC ............ *H04L 1/188* (2013.01); *H04L 5/0055* (2013.01); *H04L 49/552* (2013.01)

(58) Field of Classification Search
CPC ...... H04L 1/188; H04L 5/0055; H04L 49/552
(Continued)

(56) References Cited

U.S. PATENT DOCUMENTS 8,583,053 B1 * 11/2013 Mahbod ............... H04L 1/1825
455/435.2
10,616,947 B1 * 4/2020 Choi ..................... H04L 1/1848
(Continued)

FOREIGN PATENT DOCUMENTS

| CN | 1370361 A | 9/2002 |
| CN | 1430833 A | 7/2003 |

(Continued)

OTHER PUBLICATIONS

C. Bormann et al, CoAP Simple Congestion Control/Advanced; draft-ietf-core-cocoa-02, CoRE Working Group, Oct. 30, 2017, 17 pages.
(Continued)

*Primary Examiner* — Faisal Choudhury
(74) *Attorney, Agent, or Firm* — Womble Bond Dickinson (US) LLP

(57) ABSTRACT

This application provide a retransmission control method, a communications interface, and an electronic device. When a transmit end transmits a first data packet to a receive end and does not receive an acknowledgement corresponding to the first data packet within a first RTO, the transmit end retransmits a second data packet based on a second RTO. The second data packet is a data packet transmitted by the transmit end after the transmit end transmits the first data packet. The second RTO is related to a receive timestamp of the acknowledgement corresponding to the first data packet and a transmit timestamp of the first data packet.

20 Claims, 15 Drawing Sheets

(51) Int. Cl.
*H04L 1/1867* (2023.01)
*H04L 49/552* (2022.01)

(58) Field of Classification Search
USPC ......................................................... 370/394
See application file for complete search history.

(56) References Cited

U.S. PATENT DOCUMENTS

| | | | |
|---|---|---|---|
| 2002/0124096 A1 | 9/2002 | Loguinov et al. | |
| 2003/0043744 A1* | 3/2003 | Lu | H04W 28/10 370/236 |
| 2007/0133416 A1 | 6/2007 | Hyon et al. | |
| 2015/0055482 A1* | 2/2015 | Larson | H04L 1/1858 370/242 |
| 2017/0222936 A1 | 8/2017 | Al-Roubaiey et al. | |
| 2017/0237779 A1* | 8/2017 | Seetharaman | H04L 63/306 726/30 |
| 2018/0041415 A1* | 2/2018 | Nitinawarat | H04L 69/163 |

FOREIGN PATENT DOCUMENTS

| | | |
|---|---|---|
| CN | 1551551 A | 12/2004 |
| CN | 1863033 A | 11/2006 |
| CN | 101047485 A | 10/2007 |
| CN | 101094047 A | 12/2007 |
| CN | 101119183 A | 2/2008 |
| CN | 101447857 A | 6/2009 |
| CN | 101860423 A | 10/2010 |
| CN | 102170340 A | 8/2011 |
| CN | 102917403 A | 2/2013 |
| CN | 103095434 A | 5/2013 |
| CN | 103546248 A | 1/2014 |
| CN | 104184546 A | 12/2014 |
| CN | 104243090 A | 12/2014 |
| CN | 105634836 A | 6/2016 |
| CN | 105933242 A | 9/2016 |
| CN | 106533639 A | 3/2017 |
| CN | 106788911 A | 5/2017 |
| CN | 106982108 A | 7/2017 |
| CN | 107104763 A | 8/2017 |
| CN | 107147481 A | 9/2017 |
| CN | 107172658 A | 9/2017 |
| CN | 107258064 A | 10/2017 |
| CN | 108494782 A | 9/2018 |
| CN | 110677221 A | 1/2020 |
| EP | 1511288 A2 | 3/2005 |
| WO | 2005006665 A1 | 1/2005 |
| WO | 2017106450 A1 | 6/2017 |

OTHER PUBLICATIONS

Zhongyan Yuan et al., "The Design and Implementation of Coap Over websocket", Mar. 13, 2017, total:58 pages.
C. Bormann et al., CoAP Simple Congestion Control/Advanced, draft-ietf-core-cocoa-03. Feb. 21, 2018, 18 pages.
John Nagle, Congestion Control in IP/TCP Internetworks. RFC896, Jan. 6, 1984, 9 paes.
Z. Shelby et al., The Constrained Application Protocol (CoAP). RFC7252, Jun. 2014, 112 pages.

* cited by examiner

| No. | C | U | N | R | Name | Format | Length | Default |
|---|---|---|---|---|---|---|---|---|
| TBD | | | X | | Rexmit-Cnt | uint | 0-1 | 0 |

C=Critical, U=Unsafe, N=NoCacheKey, R=Repeatable

RETRANSMISSION CONTROL METHOD, COMMUNICATIONS INTERFACE, AND ELECTRONIC DEVICE

CROSS-REFERENCE TO RELATED APPLICATIONS

This application claims priority to a continuation of International Application No. PCT/CN2019/081718, filed on Apr. 8, 2019, which claims priority to Chinese Patent Application No. 201810710158.6, filed on Jul. 2, 2018. The disclosures of the aforementioned applications are hereby incorporated by reference in their entireties.

TECHNICAL FIELD

Embodiments of the present invention relate to the communications field, and more specifically, to a data transmission method and device.

BACKGROUND

With the development and popularization of low-power wide area network technologies, application of the internet of things (IoT) has been extended from general local area network applications to large-scale and extensive deployment. IoT devices can transmit data to a cloud. The cloud can also proactively collect data from the IoT devices and control remote IoT devices. The internet of things needs a reliable transmission protocol and a retransmission control algorithm thereof. However, for the internet of things, an underlying data connection of the internet of things is particularly susceptible to interference. Therefore, a packet error loss rate is comparatively high. In addition, there are usually low power consumption requirements for the IoT devices. Excessive retransmissions consume power consumption of the devices, affecting online service time of the IoT devices. From a perspective of standard technology development, the IETF formulates a constrained application protocol (CoAP). The CoAP protocol is an application layer protocol applicable to the IoT devices, and can run on a user datagram protocol (UDP). Because the UDP protocol does not have a retransmission control mechanism, a retransmission control mechanism needs to be designed for the CoAP protocol, so that after a transmit end transmits a data packet to a receive end, if the transmit end does not receive an acknowledgement transmitted by the receive end within a retransmission timeout time (RTO), the transmit end may retransmit the data packet. In the designed retransmission control mechanism provided by the RFC7252, an initial RTO is simply set to two seconds (2s), subsequent RTOs are set to 4s, 8s, 16s, and 32s in sequence, and a maximum of four retransmissions is allowed. In a retransmission control mechanism provided by a CoAP simple congestion control/ advanced algorithm (COCOA), an RTO that is set in the CoCoA is based on an estimated value of a round-trip time (RTT) and network latency is considered. The RTO is set to T, K×T, K2×T, K3×T, K4×T, and the like in sequence, where backoff is performed based on an exponent of K. The parameter K is a parameter that is dynamically adjusted according to a scenario, and K may be 1.5, 2, or 3. T is a time calculated based on an RTT sample. Compared with the RFC7252, the CoCoA is more aggressive but improves performance of device-cloud transmission to some extent. However, the two retransmission mechanisms may increase end-to-end transmission time of a data packet due to unnecessary retransmission, causing a waste of network resources and device power consumption.

SUMMARY

Embodiments of this application provide a retransmission control method, a communications interface, and an electronic device, to reduce unnecessary retransmission, shorten end-to-end transmission time of a data packet, save network resources, and reduce device power consumption.

To achieve the foregoing objective of the invention, according to a first aspect, an embodiment of this application provides a retransmission control method. The method includes the following:

a transmit end transmits a first data packet to a receive end. If the transmit end does not receive an acknowledgement corresponding to the first data packet within a first RTO, where the acknowledgement indicates that the receive end has received the first data packet, the following operations are performed:

the transmit end retransmits the first data packet, and calculates a second RTO, where the second RTO is related to a receive timestamp of the acknowledgement corresponding to the first data packet and a transmit timestamp of the first data packet. In other words, the second RTO is calculated based on the receive timestamp of the acknowledgement corresponding to the first data packet and the transmit timestamp of the first data packet. The transmit end retransmits a second data packet based on the second RTO, where the second data packet is a data packet transmitted by the transmit end after the transmit end transmits the first data packet. An acknowledgement corresponding to a data packet is an acknowledgement returned by the receive end to the transmit end in response to receiving the data packet.

When the transmit end does not receive the acknowledgement corresponding to the first data packet within the first RTO, that the acknowledgement is not received in time may not be caused by latency, but may be caused by congestion that has occurred on a network. The second data packet is then retransmitted based on the second RTO. The second RTO is a value calculated based on a round-trip time required when the retransmission occurs. For setting of a period of a retransmission timer, the second RTO is considered, that is, latency in current comparatively poor network transmission is considered. Compared with a case in which a value obtained after the first RTO is exponentially increased is still used as an RTO, the setting can avoid unnecessary retransmission, shorten data packet transmission time, save network resources, and reduce device power consumption.

In a possible embodiment, if the transmit end receives the acknowledgement corresponding to the first data packet within the first RTO, the transmit end updates the first RTO based on the transmit timestamp of the first data packet and the receive timestamp of the acknowledgement corresponding to the first data packet. If the transmit end does not receive an acknowledgement corresponding to the second data packet within the updated first RTO, the transmit end retransmits the second data packet, where the second data packet is a data packet transmitted by the transmit end after the transmit end transmits the first data packet.

In a possible embodiment, the retransmission performed based on the second RTO includes the following:

If the transmit end does not receive an acknowledgement corresponding to the second data packet within the first RTO, the transmit end retransmits the second data packet.

If the transmit end does not receive the acknowledgement corresponding to the second data packet within the second RTO, the transmit end retransmits the second data packet again.

When the transmit end transmits the second data packet for the first time, the first RTO, that is, latency in the network, is considered, to avoid unnecessary retransmission that occurs because an RTO is set to be less than the latency in the network. When an RTO for the first retransmission is set to the second RTO, a case in which network transmission is comparatively poor is considered, to avoid unnecessary retransmission caused by an excessively small RTO, shorten data packet transmission time, save network resources, and reduce device power consumption.

In a possible embodiment, the retransmission performed based on the second RTO includes the following:

If the transmit end does not receive an acknowledgement corresponding to the second data packet within the first RTO, the transmit end retransmits the second data packet.

If the transmit end does not receive the acknowledgement corresponding to the second data packet within the second RTO, the transmit end retransmits the second data packet again, where the second RTO is greater than a product of the first RTO and a first coefficient, and a value of the first coefficient is greater than 1. Specifically, the value of the first coefficient is 2.

When the transmit end transmits the first data packet, the period of the retransmission timer is a value obtained after the first RTO is exponentially increased, to be specific, the first RTO, the first RTO×K, the first RTO×K2, ..., and the first RTO×Ki. When the transmit end transmits the second data packet for the first time, the first RTO, that is, the latency in the network, is considered, to avoid unnecessary retransmission that occurs because an RTO is set to be less than the latency in the network. For the second data packet that is retransmitted for the first time, a value of the RTO is a maximum value between the second RTO and the first RTO×K, where K is the first coefficient. When the second RTO is set to the maximum value between the two RTOs, a case in which current network transmission is worst is considered, to avoid unnecessary retransmission caused by an excessively small RTO, shorten data packet transmission time, save network resources, and reduce device power consumption.

In a possible embodiment, the method further includes: If the transmit end does not receive the acknowledgement corresponding to the second data packet within the first RTO×K2, the transmit end retransmits the second data packet for the third time. According to this rule, if the transmit end does not receive the acknowledgement corresponding to the second data packet within the first RTO×Ki, the transmit end retransmits the second data packet for the $(i+1)^{th}$ time, where i is an integer greater than or equal to 0.

In a possible embodiment, the method further includes the following:

If the transmit end receives the acknowledgement corresponding to the second data packet within the first RTO, the following operations are performed:

The transmit end updates the first RTO based on a transmit timestamp of the second data packet and a receive timestamp of the acknowledgement corresponding to the second data packet. If the transmit end does not receive an acknowledgement corresponding to a third data packet within the updated first RTO, the transmit end retransmits the third data packet, where the third data packet is a data packet transmitted by the transmit end after the transmit end transmits the second data packet.

If the transmit end receives the acknowledgement corresponding to the second data packet within the first RTO, it indicates that congestion in network transmission is alleviated, and a comparatively smooth network transmission status may be resumed. In this case, the period of the retransmission timer is adjusted to the first RTO, and a retransmission is performed based on the retransmission timer that uses a value obtained after the updated first RTO is exponentially increased, so that a data packet that needs to be retransmitted is retransmitted as soon as possible, and overall transmission time of the data packet is reduced.

In a possible embodiment, the method further includes the following:

The transmit end updates the second RTO, where the updated second RTO is related to a receive timestamp of the acknowledgement corresponding to the second data packet and a transmit timestamp of the second data packet.

If the transmit end does not receive an acknowledgement corresponding to a third data packet within the second RTO, the transmit end retransmits the third data packet, where the third data packet is a data packet transmitted by the transmit end after the transmit end transmits the second data packet.

If the transmit end does not receive the acknowledgement corresponding to the second data packet within the first RTO, it indicates that a network transmission status is not alleviated, and congestion may occur. Therefore, the period of the retransmission timer is adjusted to the second RTO. In this case, a retransmission timeout time used after the third data packet is transmitted for the first time is the second RTO. The second RTO may allow comparatively long waiting time to wait for alleviation of the network transmission status, to avoid unnecessary retransmission caused by an excessively small RTO, shorten data packet transmission time, save network resources, and reduce device power consumption.

In a possible embodiment, the method further includes the following:

If the transmit end receives the acknowledgement corresponding to the third data packet within the second RTO, the following operations are performed:

The transmit end updates the first RTO based on a transmit timestamp of the third data packet and a receive timestamp of the acknowledgement corresponding to the third data packet.

If the transmit end does not receive an acknowledgement corresponding to a fourth data packet within the updated first RTO, the transmit end retransmits the fourth data packet, where the fourth data packet is a data packet transmitted by the transmit end after the transmit end transmits the third data packet.

If the transmit end receives the acknowledgement corresponding to the third data packet within the first RTO, it indicates that congestion in network transmission is alleviated, and a comparatively smooth network transmission status may be resumed. In this case, the period of the retransmission timer is adjusted to the first RTO, and a retransmission is performed based on the retransmission timer that uses a value obtained after the first updated RTO is exponentially increased, so that a data packet that needs to be retransmitted is retransmitted as soon as possible, and overall transmission time of the data packet is reduced.

In a possible embodiment, the method further includes the following:

The transmit end updates the second RTO (Slow RTO), where the updated second RTO is related to a receive timestamp of the acknowledgement corresponding to the third data packet and a transmit timestamp of the third data packet.

If the transmit end does not receive an acknowledgement corresponding to a fourth data packet within the updated second RTO, the transmit end retransmits the fourth data packet, where the fourth data packet is a data packet transmitted by the transmit end after the transmit end transmits the third data packet.

In a possible embodiment, the second RTO is a time difference between the receive timestamp of the acknowledgement corresponding to the first data packet and the transmit timestamp of the first data packet.

In a possible embodiment, the second RTO is a product of a second coefficient and a time difference between the transmit timestamp of the first data packet and the receive timestamp of the acknowledgement corresponding to the first data packet, where a value of the second coefficient is greater than 0. Specifically, the value of the second coefficient may be 1.5.

In a possible embodiment, the first data packet carries a retransmission sequence number, the retransmission sequence number indicates a quantity of times the first data packet is transmitted, and the acknowledgement received by the transmit end carries a retransmission sequence number that is the same as the retransmission sequence number in the first data packet corresponding to the acknowledgement. The second RTO is a time difference between the receive timestamp of the acknowledgement received by the transmit end and the transmit timestamp of the first data packet corresponding to the acknowledgement. A data packet corresponding to an acknowledgement is a data packet received by the receive end, and the data packet may be a data packet transmitted for the first time, or may be a retransmitted data packet. In this case, a transmit timestamp of the data packet corresponding to the acknowledgement may be a transmit timestamp generated when the data packet is transmitted for the first time, or may be a transmit timestamp generated when the data packet is retransmitted.

A retransmission sequence number is carried in a data packet, to determine the data packet that is responded to by an acknowledgement carrying the retransmission sequence number and that is transmitted/retransmitted at specific time. A round-trip time required when a retransmission occurs can be calculated more accurately, so that a more accurate second RTO can be calculated.

In a possible embodiment, the first data packet carries a retransmission sequence number, the retransmission sequence number indicates a quantity of times the first data packet is transmitted, and the acknowledgement received by the transmit end carries a retransmission sequence number that is the same as the retransmission sequence number in the first data packet corresponding to the acknowledgement. The second RTO is a product of a second coefficient and a time difference between the receive timestamp of the acknowledgement received by the transmit end and the transmit timestamp of the first data packet corresponding to the acknowledgement, where a value of the second coefficient is greater than 0. Specifically, the value of the second coefficient may be 1.5.

In a possible embodiment, the first data packet includes an extension field, and the extension field includes the retransmission sequence number.

In a possible implementation, the retransmission sequence number is in a token field in the first data packet.

According to a second aspect, an embodiment of this application provides an electronic device, where the electronic device includes a transmission unit, a calculation unit, and a receiving unit.

The transmission unit is configured to transmit a first data packet to a receive end. The transmission unit is further configured to retransmit the first data packet when the receiving unit does not receive an acknowledgement corresponding to the first data packet within a first RTO, where the acknowledgement indicates that the receive end has received the first data packet. The transmission unit is further configured to retransmit a second data packet based on a second RTO, where the second data packet is a data packet transmitted by the transmission unit after the transmission unit transmits the first data packet.

The calculation unit is configured to calculate the second RTO, where the second RTO is related to a receive timestamp of the acknowledgement corresponding to the first data packet and a transmit timestamp of the first data packet.

The receiving unit is configured to receive the acknowledgement corresponding to the first data packet.

In a possible embodiment:

The calculation unit is further configured to update the first RTO based on the transmit timestamp of the first data packet and the receive timestamp of the acknowledgement.

The transmission unit is further configured to transmit the second data packet to the receive end, and is further configured to: when the receiving unit receives the acknowledgement corresponding to the first data packet within the first RTO and the receiving unit does not receive an acknowledgement corresponding to the second data packet within the updated RTO, retransmit the second data packet.

The receiving unit is further configured to receive the acknowledgement corresponding to the first data packet.

In a possible embodiment, the transmission unit is configured to: when the receiving unit does not receive an acknowledgement corresponding to the second data packet within the first RTO, retransmit the second data packet; and when the receiving unit does not receive the acknowledgement corresponding to the second data packet within the second RTO, retransmit the second data packet again.

The receiving unit is further configured to receive the acknowledgement corresponding to the second data packet.

In a possible embodiment, the transmission unit is configured to: when the receiving unit does not receive an acknowledgement corresponding to the second data packet within the first RTO, retransmit the second data packet; and when the receiving unit does not receive the acknowledgement corresponding to the second data packet within the second RTO, retransmit the second data packet again, where the second RTO is greater than a product of the first RTO and a first coefficient, and a value of the first coefficient is greater than 1. Specifically, the value of the first coefficient may be 2.

In a possible embodiment, the calculation unit is further configured to update the first RTO based on a transmit timestamp of the second data packet and a receive timestamp of the acknowledgement corresponding to the second data packet.

The transmission unit is further configured to: when the receiving unit receives the acknowledgement corresponding to the second data packet within the first RTO and the receiving unit does not receive an acknowledgement corresponding to a third data packet within the updated first RTO, retransmit the third data packet, where the third data packet is a data packet transmitted by the transmission unit after the transmission unit transmits the second data packet.

The receiving unit is further configured to receive the acknowledgement corresponding to the third data packet.

In a possible embodiment, the calculation unit is further configured to update the second RTO, where the updated second RTO is related to a receive timestamp of the acknowledgement corresponding to the second data packet and a transmit timestamp of the second data packet.

The transmission unit is further configured to: when the receiving unit does not receive an acknowledgement corresponding to a third data packet within the second RTO, retransmit the third data packet, where the third data packet is a data packet transmitted by the transmission unit after the transmission unit transmits the second data packet.

In a possible embodiment, the calculation unit is further configured to update the first RTO based on a transmit timestamp of the third data packet and a receive timestamp of the acknowledgement corresponding to the third data packet.

The transmission unit is further configured to: when the receiving unit receives the acknowledgement corresponding to the third data packet within the second RTO and the receiving unit does not receive an acknowledgement corresponding to a fourth data packet within the updated first RTO, retransmit the fourth data packet, where the fourth data packet is a data packet transmitted by the transmission unit after the transmission unit transmits the third data packet.

The receiving unit is further configured to receive the acknowledgement corresponding to the fourth data packet.

In a possible embodiment, the calculation unit is further configured to update the second RTO, where the updated second RTO is related to a receive timestamp of the acknowledgement corresponding to the third data packet and a transmit timestamp of the third data packet.

The transmission unit is further configured to: when the receiving unit does not receive an acknowledgement corresponding to a fourth data packet within the updated second RTO, retransmit the fourth data packet, where the fourth data packet is a data packet transmitted by the transmission unit after the transmission unit transmits the third data packet.

The receiving unit is further configured to receive the acknowledgement corresponding to the fourth data packet.

In a possible embodiment, the second RTO is a time difference between the receive timestamp of the acknowledgement corresponding to the first data packet and the transmit timestamp of the first data packet.

In a possible embodiment, the second RTO is a product of a second coefficient and a time difference between the transmit timestamp of the first data packet and the receive timestamp of the acknowledgement corresponding to the first data packet, where a value of the second coefficient is greater than 0. Specifically, the value of the second coefficient may be 1.5.

In a possible embodiment, the first data packet carries a retransmission sequence number, the retransmission sequence number indicates a quantity of times the first data packet is transmitted, and the acknowledgement received by the receiving unit carries a retransmission sequence number that is the same as the retransmission sequence number in the first data packet corresponding to the acknowledgement. The second RTO is a time difference between the receive timestamp of the acknowledgement received by the receiving unit and the transmit timestamp of the first data packet corresponding to the acknowledgement.

In a possible embodiment, the first data packet carries a retransmission sequence number, the retransmission sequence number indicates a quantity of times the first data packet is transmitted, and the acknowledgement received by the receiving unit carries a retransmission sequence number that is the same as the retransmission sequence number in the first data packet corresponding to the acknowledgement. The second RTO is a product of a second coefficient and a time difference between the receive timestamp of the acknowledgement received by the receiving unit and the transmit timestamp of the first data packet corresponding to the acknowledgement, where a value of the second coefficient is greater than 0. Specifically, the value of the second coefficient may be 1.5.

In a possible embodiment, the first data packet includes an extension field, and the extension field includes the retransmission sequence number.

In a possible embodiment, the retransmission sequence number is in a token field in the first data packet.

According to a third aspect, an embodiment of this application provides an electronic device, including a processor, a memory, a retransmission timer, and a communications interface. A period of the retransmission timer is a first RTO, the memory stores a protocol stack program, and the processor executes the protocol stack program to perform the following operations:

transmitting a first data packet to a receive end through the communications interface;

when the retransmission timer expires and the communications interface does not receive an acknowledgement indicating that the first data packet has been received by the receive end, retransmitting the first data packet through the communications interface, and adjusting the period of the retransmission timer to a second RTO, where the second RTO is related to a receive timestamp of the acknowledgement corresponding to the first data packet and a transmit timestamp of the first data packet; and retransmitting a second data packet through the communications interface based on the second RTO, where the second data packet is a data packet transmitted after the first data packet is transmitted through the communications interface.

In a possible embodiment, the period of the retransmission timer is the first RTO and the second RTO, and the processor executes the protocol stack program to perform the following operations:

when the retransmission timer expires and the communications interface does not receive an acknowledgement indicating that the second data packet has been received by the receive end, retransmitting the second data packet through the communications interface; and when the retransmission timer expires again and the communications interface does not receive the acknowledgement indicating that the second data packet has been received by the receive end, retransmitting the second data packet again through the communications interface.

In a possible embodiment, the period of the retransmission timer is the first RTO and the second RTO, where the second RTO is greater than a product of the first RTO and a first coefficient, and a value of the first coefficient is greater than 1, and the processor executes the protocol stack program to perform the following operations:

when the retransmission timer expires and the communications interface does not receive an acknowledgement indicating that the second data packet has been received by the receive end, retransmitting the second data packet through the communications interface; and when the retransmission timer expires again and the communications interface does not receive the acknowledgement indicating that the second data packet has been received by the receive end, retransmitting the second data packet again through the communications interface. Specifically, the value of the first coefficient may be 2.

In a possible embodiment, the period of the retransmission timer is the first RTO, and when the retransmission timer does not expire and the communications interface receives the acknowledgement indicating that the second data packet has been received by the receive end, the processor executes the protocol stack program to further perform the following operations:

updating the first RTO based on a transmit timestamp of the second data packet and a receive timestamp of the acknowledgement corresponding to the second data packet;

adjusting the period of the retransmission timer to the updated first RTO; and when the retransmission timer expires and the communications interface does not receive an acknowledgement corresponding to a third data packet, retransmitting the third data packet through the communications interface, where the third data packet is a data packet transmitted after the second data packet is transmitted through the communications interface.

In a possible embodiment, the processor executes the protocol stack program to further perform the following operations:

updating the second RTO, where the updated second RTO is related to a receive timestamp of the acknowledgement corresponding to the second data packet and a transmit timestamp of the second data packet;

adjusting the period of the retransmission timer to the second RTO; and when the retransmission timer expires and the communications interface does not receive an acknowledgement corresponding to a third data packet, retransmitting the third data packet through the communications interface, where the third data packet is a data packet transmitted after the second data packet is transmitted through the communications interface.

In a possible embodiment, the period of the retransmission timer is the second RTO, and when the retransmission timer does not expire and the communications interface receives the acknowledgement indicating that the third data packet has been received by the receive end, the processor executes the protocol stack program to further perform the following operations:

updating the first RTO based on a transmit timestamp of the third data packet and a receive timestamp of the acknowledgement corresponding to the third data packet;

adjusting the period of the retransmission timer to the updated first RTO; and when the retransmission timer expires and the communications interface does not receive an acknowledgement corresponding to a fourth data packet, retransmitting the fourth data packet through the communications interface, where the fourth data packet is a data packet transmitted after the third data packet is transmitted through the communications interface.

In a possible embodiment, the processor executes the protocol stack program to further perform the following operations:

updating the second RTO, where the updated second RTO is related to a receive timestamp of the acknowledgement corresponding to the third data packet and a transmit timestamp of the third data packet;

adjusting the period of the retransmission timer to the updated second RTO; and when the retransmission timer expires and the communications interface does not receive an acknowledgement corresponding to a fourth data packet, retransmitting the fourth data packet through the communications interface, where the fourth data packet is a data packet transmitted after the third data packet is transmitted through the communications interface.

In a possible embodiment, the second RTO is a time difference between the receive timestamp of the acknowledgement corresponding to the first data packet and the transmit timestamp of the first data packet.

In a possible embodiment, the second RTO is a product of a second coefficient and a time difference between the transmit timestamp of the first data packet and the receive timestamp of the acknowledgement corresponding to the first data packet, where a value of the second coefficient is greater than 0.

In a possible embodiment, the first data packet carries a retransmission sequence number, the retransmission sequence number indicates a quantity of times the first data packet is transmitted, and the acknowledgement received by the communications interface carries a retransmission sequence number that is the same as the retransmission sequence number in the data packet corresponding to the acknowledgement. The second RTO is a time difference between the receive timestamp of the acknowledgement received by the communications interface and the transmit timestamp of the data packet corresponding to the acknowledgement.

In a possible embodiment, the first data packet carries a retransmission sequence number, the retransmission sequence number indicates a quantity of times the first data packet is transmitted, and the acknowledgement received by the communications interface carries a retransmission sequence number that is the same as the retransmission sequence number in the data packet corresponding to the acknowledgement. The second RTO is a product of a second coefficient and a time difference between the receive timestamp of the acknowledgement received by the communications interface and the transmit timestamp of the data packet corresponding to the acknowledgement, where a value of the second coefficient is greater than 0. Specifically, the value of the second coefficient may be 1.5.

In a possible embodiment, the first data packet includes an extension field, and the extension field includes the retransmission sequence number.

In a possible embodiment, the retransmission sequence number is in a token field in the first data packet.

According to a fourth aspect, an embodiment of this application provides a communications interface, including an input/output (IO) port and a processor.

The processor is configured to transmit a first data packet to a receive end through the input/output port.

When the input/output port does not receive an acknowledgement corresponding to the first data packet within a first RTO, where the acknowledgement indicates that the receive end has received the first data packet, the processor performs the following operations:

retransmitting the first data packet through the input/output port, and calculates a second RTO, where the second RTO is related to a receive timestamp of the acknowledgement corresponding to the first data packet and a transmit timestamp of the first data packet; and retransmitting a second data packet through the input/output port based on the second RTO, where the second data packet is a data packet transmitted after the first data packet is transmitted through the input/output port.

In a possible embodiment, the processor is configured to:
when the input/output port does not receive an acknowledgement corresponding to the second data packet within the first RTO, retransmit the second data packet through the input/output port; and when the input/output port does not receive the acknowledgement corresponding to the second data packet within the second RTO, retransmit the second data packet again through the input/output port.

In a possible embodiment, the processor is configured to:

when the input/output port does not receive an acknowledgement corresponding to the second data packet within the first RTO, retransmit the second data packet through the input/output port; and when the input/output port does not receive the acknowledgement corresponding to the second data packet within the second RTO, retransmit the second data packet again through the input/output port, where the second RTO is greater than a product of the first RTO and a first coefficient, and a value of the first coefficient is greater than 1. Specifically, the value of the first coefficient may be 2.

In a possible embodiment, when the input/output port receives the acknowledgement corresponding to the second data packet within the first RTO, the processor is further configured to perform the following operations:

updating the first RTO based on a transmit timestamp of the second data packet and a receive timestamp of the acknowledgement corresponding to the second data packet; and when the input/output port does not receive an acknowledgement corresponding to a third data packet within the updated first RTO, retransmit the third data packet through the input/output port, where the third data packet is a data packet transmitted after the second data packet is transmitted through the input/output port.

In a possible embodiment, the processor is further configured to:

update the second RTO (Slow RTO), where the updated second RTO is related to a receive timestamp of the acknowledgement corresponding to the second data packet and a transmit timestamp of the second data packet; and when the input/output port does not receive an acknowledgement corresponding to a third data packet within the second RTO, retransmit the third data packet through the input/output port, where the third data packet is a data packet transmitted after the second data packet is transmitted through the input/output port.

In a possible embodiment, when the input/output port receives the acknowledgement corresponding to the third data packet within the second RTO, the processor is further configured to perform the following operations:

updating the first RTO based on a transmit timestamp of the third data packet and a receive timestamp of the acknowledgement corresponding to the third data packet; and when the input/output port does not receive an acknowledgement corresponding to a fourth data packet within the updated first RTO, retransmitting the fourth data packet through the input/output port, where the fourth data packet is a data packet transmitted after the third data packet is transmitted through the input/output port.

In a possible embodiment, the processor is further configured to:

update the second RTO, where the updated second RTO is related to a receive timestamp of the acknowledgement corresponding to the third data packet and a transmit timestamp of the third data packet; and when the input/output port does not receive an acknowledgement corresponding to a fourth data packet within the updated second RTO, retransmit the fourth data packet through the input/output port, where the fourth data packet is a data packet transmitted after the third data packet is transmitted through the input/output port.

In a possible embodiment, the second RTO is a time difference between the receive timestamp of the acknowledgement corresponding to the first data packet and the transmit timestamp of the first data packet.

In a possible embodiment, the second RTO is a product of a second coefficient and a time difference between the transmit timestamp of the first data packet and the receive timestamp of the acknowledgement corresponding to the first data packet, where a value of the second coefficient is greater than 0. Specifically, the value of the second coefficient may be 1.5.

In a possible embodiment, the first data packet carries a retransmission sequence number, the retransmission sequence number indicates a quantity of times the first data packet is transmitted, and the acknowledgement received by the communications interface carries a retransmission sequence number that is the same as the retransmission sequence number in the first data packet corresponding to the acknowledgement. The second RTO is a time difference between the receive timestamp of the acknowledgement received by the communications interface and the transmit timestamp of the first data packet corresponding to the acknowledgement.

In a possible embodiment, the first data packet carries a retransmission sequence number, the retransmission sequence number indicates a quantity of times the first data packet is transmitted, and the acknowledgement received by the communications interface carries a retransmission sequence number that is the same as the retransmission sequence number in the first data packet corresponding to the acknowledgement. The second RTO is a product of a second coefficient and a time difference between the receive timestamp of the acknowledgement received by the communications interface and the transmit timestamp of the data packet corresponding to the acknowledgement, where a value of the second coefficient is greater than 0. Specifically, the value of the second coefficient may be 1.5.

In a possible implementation, the data packet includes an extension field, and the extension field includes the retransmission sequence number.

In a possible embodiment, the retransmission sequence number is in a token field in the data packet.

According to a fifth aspect, an embodiment of this application provides an electronic device, where the electronic device includes the communications interface provided in any one of the fourth aspect or the possible implementations of the fourth aspect.

According to a sixth aspect, an embodiment of this application provides an electronic device, where the electronic device includes a processor and a computer-readable storage medium that stores a computer program. The processor is coupled to the computer-readable storage medium, and when the computer program is executed by the processor, the retransmission control method provided in any one of the first aspect or the possible implementations of the first aspect is implemented.

According to a seventh aspect, an embodiment of this application provides a computer-readable storage medium, where the computer-readable storage medium stores a computer program. When the computer program is executed by a processor, the retransmission control method provided in any one of the first aspect or the possible implementations of the first aspect is implemented.

According to an eighth aspect, an embodiment of this application provides a computer program product, including a computer program. When the computer program is executed by a processor, the retransmission control method provided in any one of the first aspect or the possible implementations of the first aspect is implemented.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

Before specific embodiments of this application are described, terms to be mentioned in the following embodiments of this application and meanings of the terms are introduced. It may be understood that, unless otherwise specified, these terms and their meanings may be the same in the embodiments of this application.

Data packet: is also referred to as a packet. It is a basic unit of network transmission and is data organized in a specific format. Different types of network protocols have different definitions for a format of a data packet, but generally speaking, a data packet may be divided into a header and a payload. The header includes information necessary in a transmission process of the data packet, such as address information and a flag bit. The payload is also referred to as a data part of the data packet, and includes data content that is transmitted.

Network congestion: refers to a case in which network transmission performance deteriorates due to limited network resources when an excessively large amount of data is transmitted on a network. The network congestion usually occurs when the network performance deteriorates due to an excessive load increase in the network.

Acknowledgement (ACK): is a control packet that is transmitted by a receive end to a transmit end in a data transmission process, and is used to acknowledge that data transmitted by the transmit end has been received.

Round-trip time (RTT): is an important performance indicator in network transmission. It indicates a total length of time starting from time at which a transmit end transmits data to time at which the transmit end receives an acknowledgement (ACK) from a receive end.

The terms "first" and "second" in this application are used to distinguish objects of a same type, and shall not be understood as an indication or implication of relative importance or implicit indication of the number of indicated technical features. Therefore, a feature limited by "first" or "second" may explicitly or implicitly include one or more features. In the description of the embodiments of the present invention, unless otherwise stated, "multiple" means two or more than two.

Figure 1:
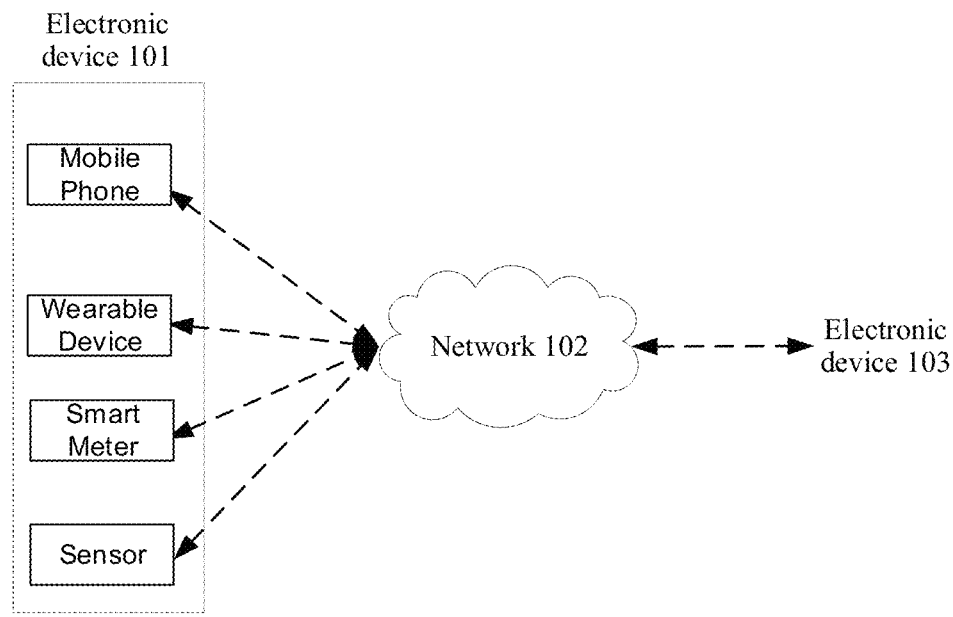
FIG. 1 is a schematic architectural diagram of data transmission according to an embodiment of the present invention.

FIG. 1 shows an architecture for data transmission between electronic devices to which this application is applicable. The architecture includes an electronic device 101, a network 102, and an electronic device 103. The electronic device 101 is communicatively connected to the electronic device 103 by using the network 102. The network may be a wired network or a wireless network, for example, a computer network, the internet, the internet of things, or a telephone network. A communication connection is established between the electronic device 101 and the electronic device 103 based on a specific communication protocol, and then data is transmitted in a unit of a data packet based on the established connection. In a transmission process, a data packet passes through one or more network devices on the network 200, for example, an access network device, a routing device, or an access point (AP). The electronic device 101 may transmit the data packet to the electronic device 103 by using the network 102. The electronic device 101 may be a terminal device, and may be a hand-held device with a wireless connection function, or another processing device connected to a wireless modem. For example, the electronic device 101 may be a mobile phone, a computer, a tablet computer, a personal digital assistant (personal digital assistant, PDA), a mobile internet device (MID), a wearable device, and an e-book reader, and may also be a portable mobile device, a pocket-sized mobile device, a hand-held mobile device, a computer built-in mobile device, or a vehicle-mounted mobile device. More specifically, the electronic device 101 may also be an internet of things device, or may be referred to as an IoT device, such as a music player, a game console, a health care device, a connected car, a smart meter, a sensor, an alarm, a set-top box, a printer, electronic glasses, an unmanned aerial vehicle, or a service robot. The electronic device 103 may be a terminal device or a server, and more specifically, may be an IoT cloud platform server. The IoT cloud platform server receives data packets transmitted by a plurality of IoT devices, and processes the received data packets. The IoT devices may collect data, and transmit data packets to the IoT cloud platform server by using the network 102. The IoT cloud platform server may also transmit a data packet to a IoT device, to remotely collect data or remotely control the IoT device. For description simplification, in the embodiments of this application, one of the two electronic devices between which the communication connection has been established is referred to as a transmit end, and the other electronic device is referred to as a receive end. It may be understood that the transmit end and the receive end may be any device that has a data reception and transmission capability. For example, the transmit end may be a server, and the receive end is another server. Alternatively, the transmit end is a terminal device, and the receive end is a server. Alternatively, both the transmit end and the receive end are terminal devices. In addition, the transmit end and the receive end are two relative roles, and may be interchangeable. To be specific, a same device may be the transmit end or may be the receive end in different scenarios.

A person skilled in the art may understand that a data transmission architecture may usually include components fewer or more than those shown in FIG. 1, or may include components different from those shown in FIG. 1. FIG. 1 shows only components that are more related to a plurality of implementations disclosed in the embodiments of this application.

Figure 2:
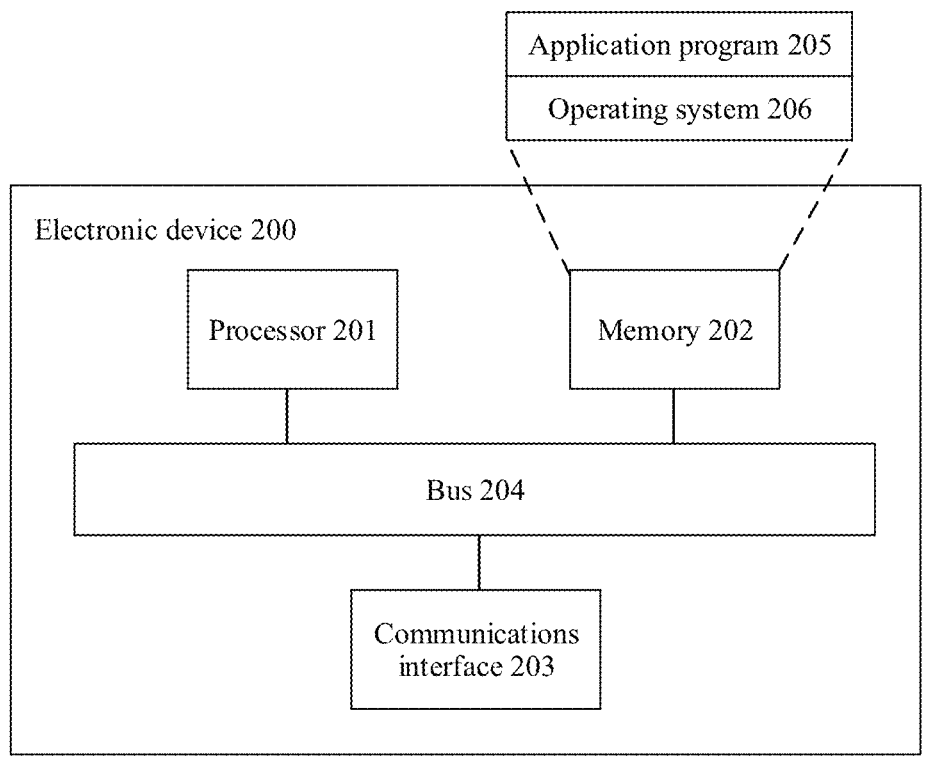
FIG. 2 is a schematic structural diagram of an electronic device according to an embodiment of the present invention.

FIG. 2 is an example of a schematic structural diagram of the electronic device 101 or the electronic device 103 according to an embodiment of this application. As shown in FIG. 2, an electronic device 200 includes components such as a processor 201, a memory 202, and a communications interface 203. A person skilled in the art may understand that the electronic device 200 may include components more or fewer than those shown in the figure, or may combine some components.

These components may communicate with each other by using one or more buses 204 or signal cables. The buses may be classified into address buses, data buses, control buses, and the like.

The processor 201 may be a central processing unit (CPU), a network processor (NP), or a combination of the CPU and the NP. The processor 201 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Figure 3:
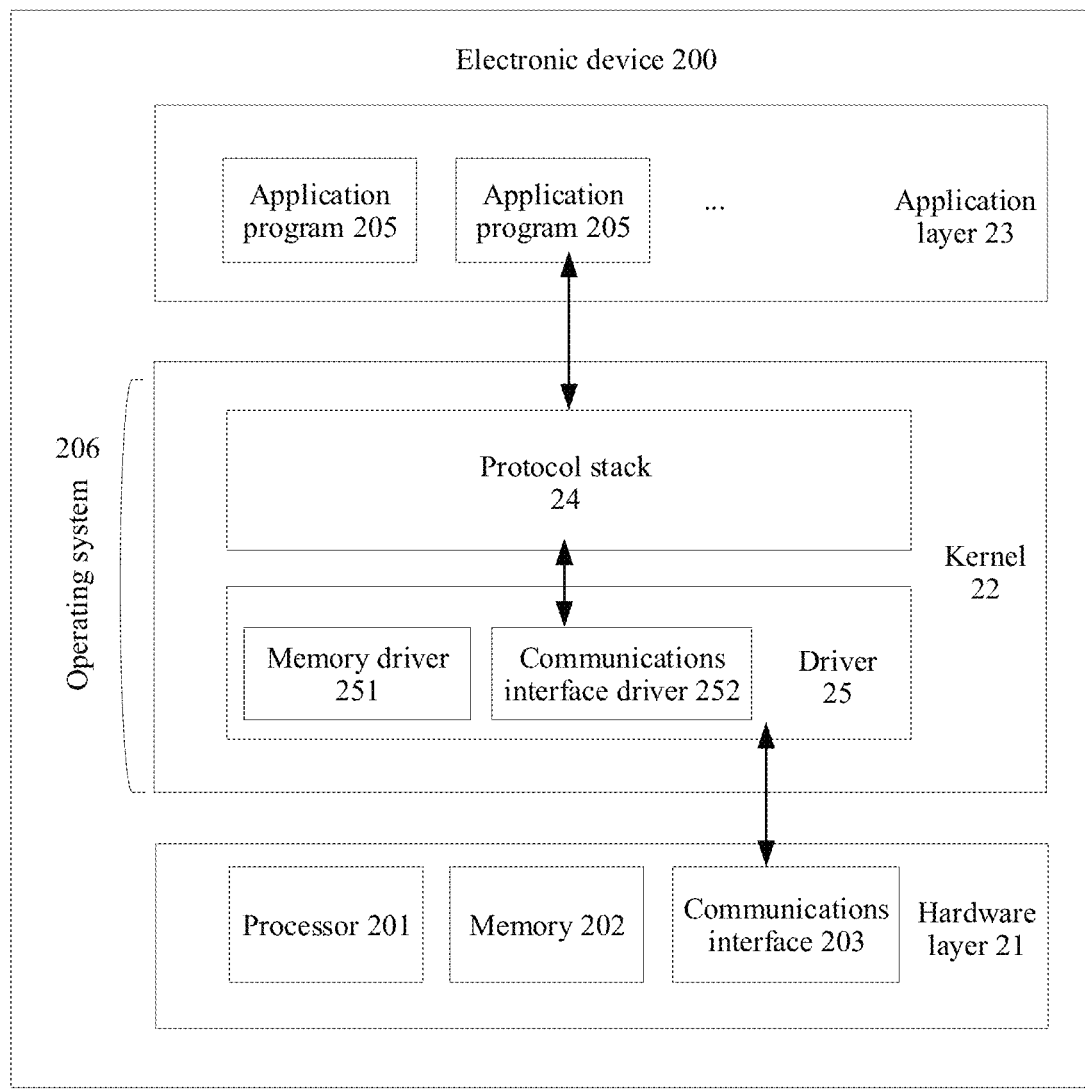
FIG. 3 is a schematic structural diagram of an electronic device according to an embodiment of the present invention.

The memory 202 is configured to store a computer program, such as an application program 205 and an operating system 206 shown in FIG. 3. The processor 201 may invoke the computer program stored in the memory 202, to implement a function defined by the computer program. For example, the processor 201 executes an operating system to implement various functions of the operating system on the electronic device 200. The operating system 206 may be Linux®, Windows®, or another operating system. This is not limited in this embodiment of this application.

The memory 202 further stores other data in addition to the computer program, for example, data generated in a running process of the operating system 206 and the application program 205. The memory 202 may include a volatile memory, for example, a random-access memory (RAM). The memory 202 may also include a non-volatile memory, for example, a flash memory (flash memory), a hard disk drive (HDD), or a solid state drive (SSDe). The memory 202 may further include a combination of the foregoing types of memories. FIG. 3 shows only one memory. Certainly, the memory 202 may alternatively be disposed as a plurality of storage devices according to a requirement. Alternatively, the memory 202 may be a memory in the processor 201. This is not limited herein.

The communications interface 203 is hardware configured to connect the electronic device 200 to another electronic device, and allows the electronic device 200 to perform communication on a network, and hardware that implements transmission and reception of a data packet. For example, the communications interface 203 may be connected to a network in a wired or wireless manner, to connect to another electronic device, for example, another external terminal or server. In the terminal device, the communications interface 203 may be a modem, an antenna, or a Wi-Fi module. In the server, the communications interface 203 may be a radio frequency unit or an antenna. The communications interface 203 may also be integrated with a processor and a memory (including a RAM and a read-only memory (ROM)).

Further, in an embodiment, as shown in FIG. 3, the electronic device 200 may be logically divided into a hardware layer 21, the operating system 206, and an application layer 23. The hardware layer 21 includes hardware resources such as the processor 201, the memory 202, and the communications interface 204 that are described above. The application layer 23 includes one or more application programs, for example, the application program 205. The operating system 206 is used as software middleware between the hardware layer 21 and the application layer 23, and is a computer program that manages and controls hardware and software resources.

The operating system 206 includes a kernel 22. The kernel 22 is configured to provide an underlying system component and service, for example, power management, memory management, a protocol stack 24, and a driver 25. The protocol stack 24 is a component that implements a network protocol. After the application program 205 issues a data transmission instruction, data passes through the protocol stack 24, and the driver 25 invokes the communications interface 203 to transmit the data. In an embodiment, the driver 25 includes a memory driver 251 and a communications interface driver 252 (configured to drive the communications interface 203). The protocol stack 24 includes a protocol component 241 and is configured to implement a network protocol function. The retransmission control method provided in the embodiments of this application may be implemented by the protocol component 241 in the kernel 22.

Figure 4:
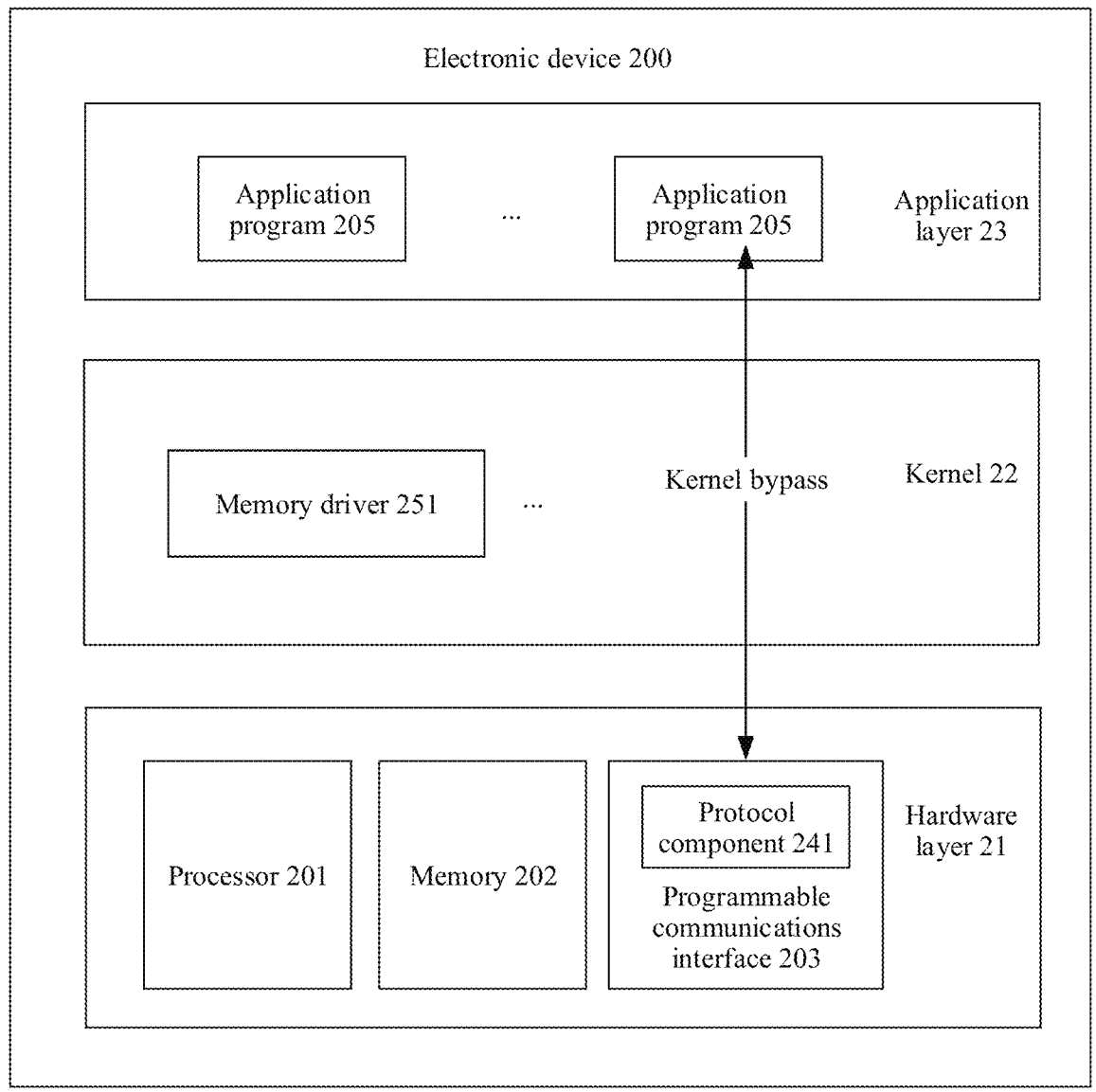
FIG. 4 is a schematic structural diagram of an electronic device according to an embodiment of the present invention.

In an embodiment, the electronic device 200 may offload a function of the protocol component to the communications interface 203, thereby implementing kernel bypass and improving data forwarding performance. As shown in FIG. 4, the communications interface 203 is a programmable communications interface, and the protocol component 203 is implemented in the programmable communications interface 203. Correspondingly, the retransmission control method provided in the embodiments of this application may be implemented by the communications interface 203. Specifically, the method may be implemented by modifying hardware or firmware of the communications interface 203. It may be that a computer program is stored in a memory integrated into the programmable communications interface 203, and a processor integrated into the programmable communications interface 203 executes the computer program to implement the retransmission control method provided in this application. It may also be that the retransmission control method provided in this application is implemented by using a logic circuit in the programmable communications interface 203.

Figure 5:
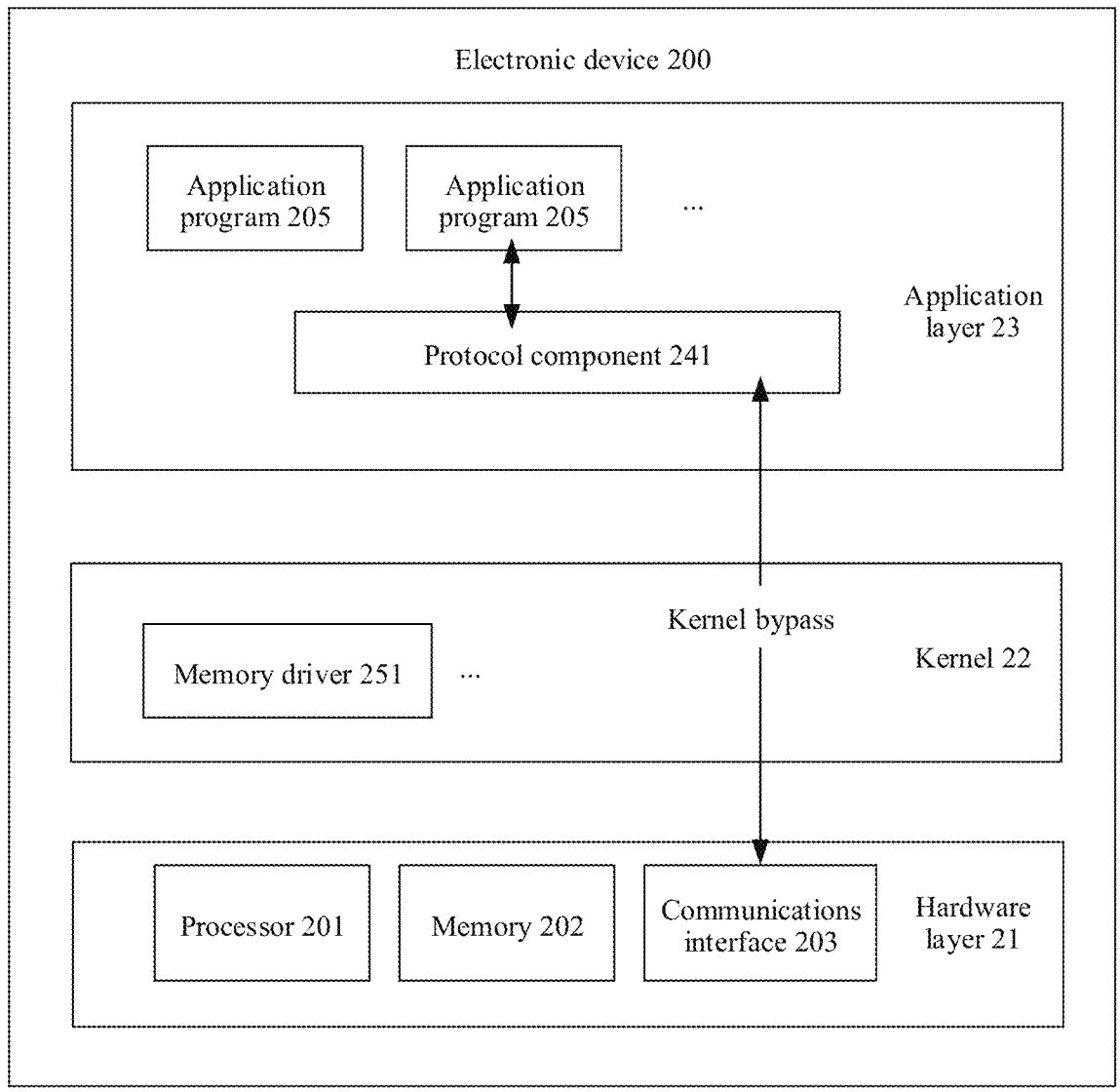
FIG. 5 is a schematic structural diagram of an electronic device according to an embodiment of the present invention.

In an embodiment, as shown in FIG. 5, the electronic device 200 may implement the protocol component 241 at the application layer 23 (for example, using a DPDK (data plane development kit) technology), thereby implementing kernel bypass and improving data forwarding performance. Correspondingly, the retransmission control method provided in the embodiments of this application may be implemented by software at the application layer.

In a data transmission process, a retransmission mechanism is designed to ensure reliability of data transmission, and a retransmission timer is specifically designed.

Figure 6:
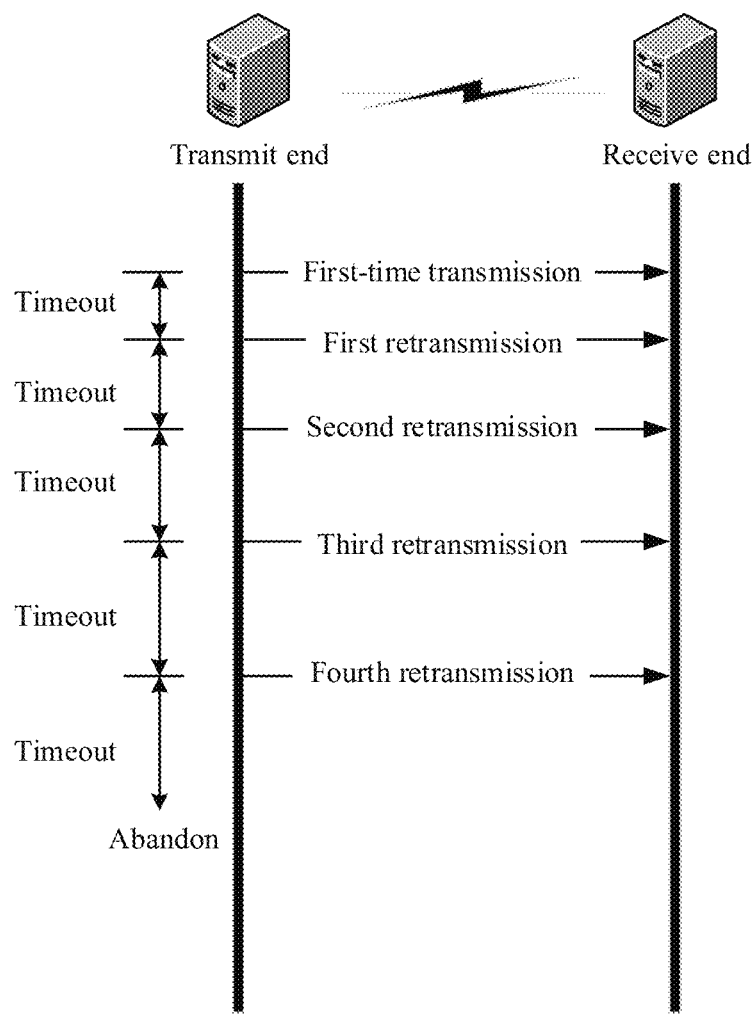
FIG. 6 is a schematic diagram of a retransmission mechanism according to an embodiment of the present invention.

The retransmission timer may also be referred to as a backoff timer. After a transmit end transmits a data packet to a receive end, when ACK is received within an RTO time that is set for the retransmission timer, in other words, when the RTO expires, the transmit end transmits the data packet again (which may also be referred to as retransmission). The RTO for the retransmission timer may be set to a plurality of intervals. FIG. 6 shows an example of such a retransmission mechanism. In FIG. 6, a transmit end and a receive end are included, and after retransmission is performed for a specific quantity of times, transmission of a data packet may be abandoned. Sometimes, the data packet transmitted by the transmit end to the receive end may be transmitted in a form of a request message. It should be understood that the transmit end and the receive end are two relative roles, and may be interchangeable. To be specific, a same device may be the transmit end or may be the receive end in different scenarios.

The CoAP protocol is an application layer protocol applicable to IoT devices and has a retransmission mechanism. In the CoAP protocol RFC7252, an RTO is set to 2, 22, 23, 24, or 25. In this retransmission mechanism, if an actual RTT is greater than the RTO, unnecessary retransmission may be performed, thereby causing a waste of network resources and device power consumption. In addition, because the transmit end cannot receive any feedback in time, a retransmitted data packet is still on an end-to-end path, which increases end-to-end transmission time of the data packet and aggravates congestion on the current path. In addition, a retransmission control mechanism in the CoCoA protocol may be excessively aggressive. To be specific, a comparatively small RTO value is calculated when an estimated RTT value is comparatively small, which leads to comparatively high retransmission frequency. As a result, a large quantity of retransmissions occur. For example, a measurement result shows that this mechanism causes a large quantity of retransmissions (up to 150% to 200%) when a data packet queue is long. The large quantity of retransmissions may increase end-to-end transmission time of a data packet due to the large quantity of retransmissions, causing a waste of network resources and device power consumption, and may aggravate network congestion.

This application provides a retransmission control method and device. The retransmission control method is performed on a retransmission control apparatus, and the retransmission control apparatus may be the electronic device 200 shown in FIG. 2 to FIG. 5. Specifically, the retransmission control apparatus may be an IoT device or an IoT cloud platform server. For uplink data, the IoT device is a transmit end, and the retransmission control apparatus is the IoT device. For downlink data, the IoT cloud platform server is a transmit end, and the retransmission control apparatus is the IoT cloud platform server. The retransmission control method may be a retransmission mechanism applicable to the CoAP protocol, or may be a retransmission mechanism applicable to another network protocol, for example, a transmission control protocol (TCP).

The retransmission control method provided in the embodiments of this application includes two RTO parameters: a first RTO and a second RTO. The first RTO may also be referred to as a standard RTO or a fast-RTO, and the second RTO may also be referred to as a slow RTO or a slow-RTO.

The first RTO is calculated by using, as a reference value, a round-trip time required when no retransmission occurs. That is, the first RTO is a time difference between a transmit timestamp of a data packet and a receive timestamp of an acknowledgement corresponding to the data packet. Specifically, the round-trip time required when no retransmission occurs may be used as the reference value and substituted into a noise processing function f(x) to calculate a slow retransmission time, where x is the reference value. Usually, f(x)=ax+b, where both a and b are constants. Each time a message exchange without retransmission occurs, a standard retransmission time may be updated based on a latest calculated round-trip time required when no retransmission occurs. In addition, different from setting of an RTO of the TCP protocol in the RFC6298, a lower limit of a retransmission timeout time in this application does not need to be limited to 1s, because the lower limit of 1s may affect timeliness of a retransmission in short-latency network. A value of an upper limit of the standard retransmission time in this application may be at least 60s. The standard retransmission time calculated in this application and an initial standard retransmission time may be varied within a range of ¼×SRTT and SRTT, where the SRTT is a smoothed round-trip time (SRTT), and may be understood as a "smoothed" RTT. According to SRTT and RTTVAR rules in the RFC6298, for the initial standard retransmission time, the SRTT may be ⅓ of the initial standard retransmission time. When the initial standard retransmission time can be set to 2s, a value of the SRTT is ⅔s. Therefore, the first RTO provided in this application can track an actual RTT of a network, and can trigger a retransmission in a timely manner. For an end-to-end path in which network losses unrelated to congestion occur, a retransmission without an extra delay is quite effective for transmitting a data packet as fast as possible.

Figure 7:
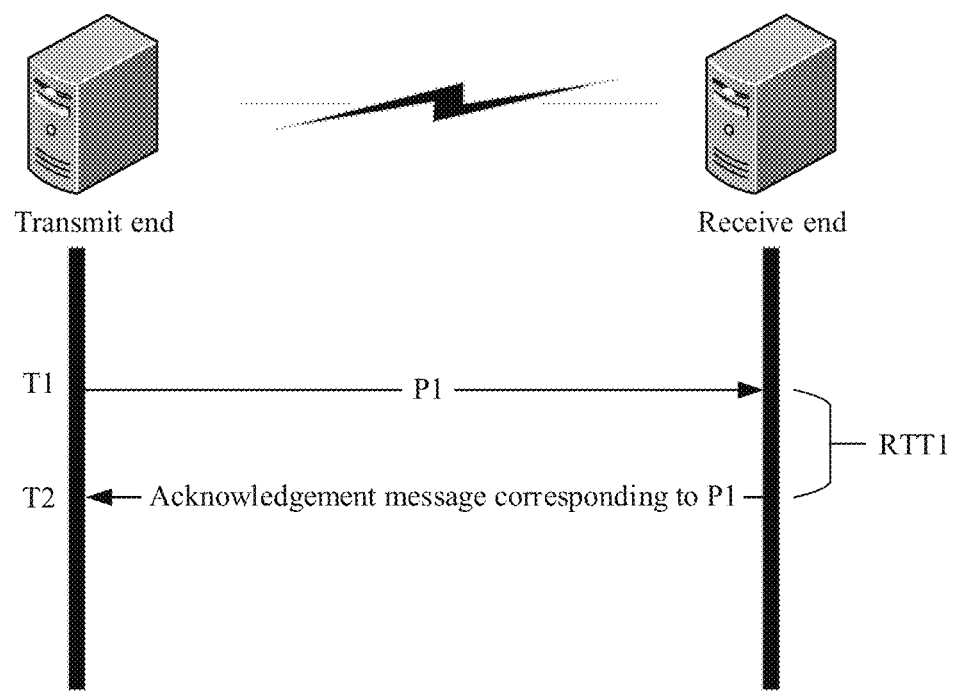
FIG. 7 is a schematic diagram of a round-trip time required when no retransmission occurs according to an embodiment of the present invention.

After the transmit end transmits a data packet to a receive end, and receives an acknowledgement corresponding to the data packet within an RTO, a time difference between a transmit timestamp of the data packet and a receive timestamp of the acknowledgement is a round-trip time required when no retransmission occurs. The acknowledgement corresponding to the data packet indicates that the receive end has received the data packet. As shown in FIG. 7, the transmit end transmits a data packet P1 to the receive end for the first time at T1, and the transmit end receives an acknowledgement returned by the receive end in response to receiving P1 at T2. In this case, the round-trip time required when no retransmission occurs is obtained by calculating RTT1=T2−T1.

The second RTO is calculated by using, as a reference value, a round-trip time required when a retransmission occurs. The second RTO is related to a receive timestamp of an acknowledgement corresponding to a data packet and a transmit timestamp of the data packet. The transmit timestamp of the data packet may be a moment at which the data packet is transmitted for the first time (original transmission), or may be a moment at which the data packet is retransmitted. In an embodiment, the round-trip time required when a retransmission occurs may be used as the second RTO, that is, the second RTO is a time difference between the transmit timestamp of the data packet and the receive timestamp of the acknowledgement corresponding to the data packet. In an embodiment, a product of a coefficient and the round-trip time required when a retransmission occurs may be used as the second RTO. The coefficient is a preset coefficient and is greater than 0. To be specific, the second RTO is a product of a second coefficient and a time difference between the transmit timestamp of the data packet and the receive timestamp of the acknowledgement corresponding to the data packet, where a value of the second coefficient is greater than 0. Specifically, the value of the second coefficient may be greater than 1, so that the second RTO is less aggressive. For example, the value of the second coefficient may be 1.5. A comparatively long round-trip time caused by a plurality of unnecessary retransmissions is considered. Therefore, the second RTO is set to a value greater than a value of an end-to-end RTT required when a retransmission occurs. The value of the end-to-end RTT may increase due to unnecessary retransmission. Therefore, each time the data packet is retransmitted, the second RTO is updated based on the round-trip time required when a retransmission occurs.

The second RTO itself may also be a form of backoff because the second RTO includes used time that is accumulated from retransmission timer backoff in a data packet transmission process. That is, the second RTO includes time consumed by all unnecessary retransmissions that possibly occur in the data packet transmission process. Assuming a stable RTT and that all retransmissions are unnecessary, in other words, the received acknowledgement message is a response to the original transmission (or referred to as a first transmission) of the data packet, in this case, time consumed in the transmission of the data packet is time starting from the transmit timestamp of the data packet to a transmit timestamp of a last retransmission plus one RTT.

Figure 8:
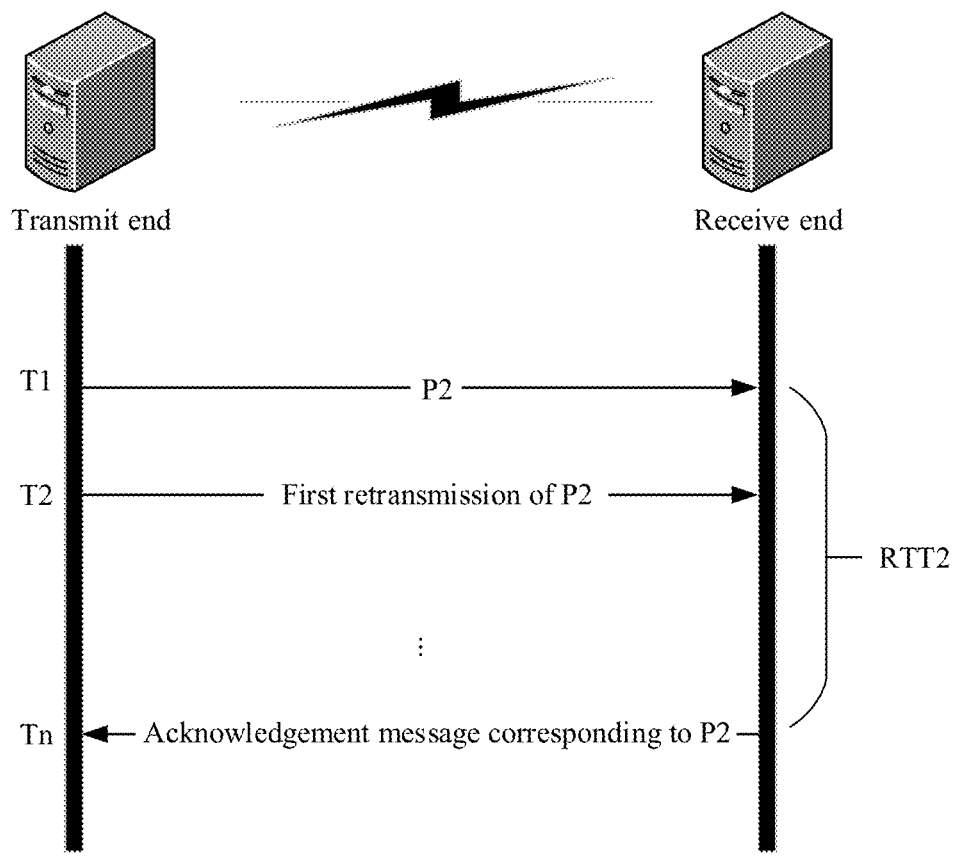
FIG. 8 is a schematic diagram of a round-trip time required when a retransmission occurs according to an embodiment of the present invention.

After the transmit end transmits a data packet to the receive end, when the transmit end finally receives an acknowledgement corresponding to the data packet after retransmitting the data packet one or more times, a time difference between a transmit timestamp of the data packet and a receive timestamp of the acknowledgement is the round-trip time required when a retransmission occurs. For example, as shown in FIG. 8, the transmit end transmits a data packet P2 to the receive end for the first time at T1, the transmit end retransmits the data packet P2 for the first time at T2, and the transmit end receives an acknowledgement returned by the receive end in response to receiving the data packet P2 at Tn. In this period, the data packet P2 may be retransmitted one or more times. In this case, the round-trip time required when a retransmission occurs is obtained by calculating RTT2=Tn−T1. Further, if the acknowledgement received by the transmit end at Tn is an acknowledgement corresponding to the data packet P2 that is retransmitted for the first time at T2, then RTT2=Tn−T2. Whenever a data packet needs to be retransmitted, time required before an acknowledgement is obtained is used as the round-trip time required when a retransmission occurs. That is, the round-trip time required when a retransmission occurs may be calculated starting from time at which the data packet is transmitted for the first time to time at which an acknowledgement corresponding to the data packet that is transmitted for the first time is received. Alternatively, the round-trip time required when a retransmission occurs may be calculated starting from time at which the data packet is retransmitted to time at which an acknowledgement corresponding to the retransmitted data packet is received.

An embodiment of this application provides a retransmission control method. When no retransmission occurs in a previous data packet transmission (or referred to as a request message exchange) process, a first RTO is used as a basis for binary exponential backoff. When a retransmission occurs in the previous data packet transmission process, a second RTO is introduced as a value of an RTO used in a backoff process. That is, the second RTO is considered in the setting of the RTO in this case.

Logic of the retransmission control method provided in this embodiment of this application may include the following three possible solutions. K mentioned in the embodiments of this application is a preset coefficient, and may be referred to as a first coefficient. A value of K is a number greater than 1.

FAST_RTO backoff method (subsequently referred to as a first retransmission mechanism): Original binary exponential backoff is performed based on the first RTO, and is used as a retransmission control mechanism when a data packet is not retransmitted. Specifically, an RTO of a retransmission timer may be set to: fast-RTO, fast-RTO×K, fast-RTO×K2, fast-RTO×K3, . . . , or fast-RTO×Ki. K is a number greater than 1, and K may be 2.

FAST SLOW FAST_RTO backoff method (subsequently referred to as a second retransmission mechanism): This mechanism may be a retransmission control mechanism used when a data packet still needs to be retransmitted one or more times when the first retransmission mechanism is used. First, the first RTO is used as an RTO for original transmission of the data packet, to reduce losses unrelated to congestion on a network. Then, if the data packet in the original transmission is retransmitted, the second RTO is used as an RTO for a first retransmission, to avoid unnecessary retransmission, and alleviate the congestion that may occur on the network in this case. If a retransmission still needs to be performed, the first RTO is used to continue backoff. Specifically, an RTO of a retransmission timer may be set to: fast-RTO, max(slow-RTO, fast-RTO×K), fast-RTO×K2, fast-RTO×K3, . . . , or fast-RTO×Ki. Specifically, the RTO may also be set to: fast-RTO, slow-RTO, fast-RTO×K2, fast-RTO×K3, . . . , or fast-RTO×Ki. K is a number greater than 1, and K may be 2.

SLOW FAST_RTO backoff method (subsequently referred to as a third retransmission mechanism): This method may be a retransmission control mechanism used when the second retransmission mechanism or the third retransmission mechanism is used for previous data packet transmission, but a data packet still needs to be retransmitted one or more times. Specifically, for original transmission of the data packet, the second RTO is used as an RTO for the original transmission, to alleviate congestion on a network. In this case, there is a high probability that an acknowledgement corresponding to the data packet can be received within the second RTO, and an unambiguous RTT sample can be obtained, where the unambiguous RTT sample is a round-trip time required when no retransmission occurs. Once a message exchange without retransmission is obtained, the first retransmission mechanism may be used as a subsequent retransmission control method. Specifically, an RTO of a retransmission timer may be set to: slow-RTO, fast-RTO, fast-RTO×K2, fast-RTO×K3, . . . , or fast-RTO×Ki. K is a number greater than 1, and K may be 2.

For a first data packet transmitted after an electronic device is initialized, because no data packet has been transmitted before, a value of an initial RTO is used as a retransmission timeout time, and the initial RTO may be set to 2s. Each time an unambiguous RTT sample is obtained, that is, when an acknowledgement corresponding to a data packet is received within an RTO that starts after the data packet is transmitted in any mechanism of the first, second, or third retransmission mechanism or in another retransmission mechanism, the first retransmission mechanism is used, and an updated first RTO is used as an RTO for subsequent data packet transmission.

According to the retransmission control method provided in the embodiments of this application, three retransmission timers corresponding to the foregoing three retransmission mechanisms may be set. When the retransmission mechanism needs to be changed, a data packet is retransmitted based on an RTO of a corresponding retransmission timer. Alternatively, RTOs that are set in the foregoing three retransmission mechanisms may be implemented by changing an RTO of a same retransmission timer.

According to the retransmission control method provided in the embodiments of this application, an RTO may be changed according to a current network status. Once the current network status changes, the RTO may be switched to a more appropriate RTO. Therefore, unnecessary retransmission can be reduced, time required for data packet transmission can be shortened, device power consumption can be reduced, and network resources occupied for transmission can be saved.

Figure 9:
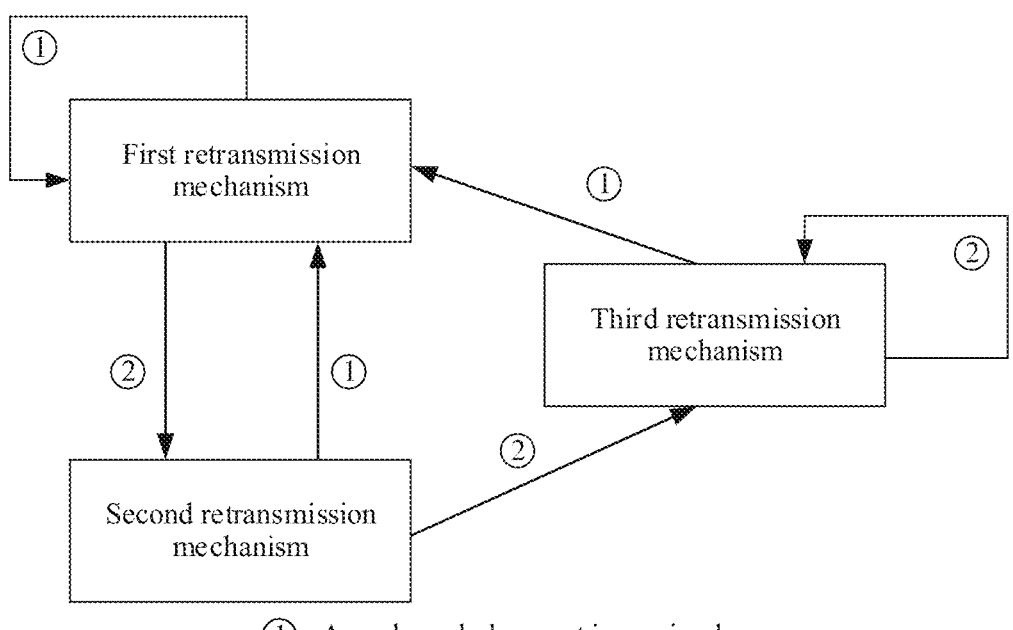
FIG. 9 is a schematic diagram of retransmission mechanism switching according to an embodiment of the present invention.

FIG. 9 is a schematic diagram of switching among the foregoing three retransmission mechanisms. (1) An acknowledgement is received before a data packet is retransmitted, which indicates that the acknowledgement corresponding to the data packet is received within a current RTO after the data packet is transmitted for the first time, where the acknowledgement corresponding to the data packet is a message returned by a receive end to a transmit end in response to the received data packet. When a case described in (1) occurs, it may indicate that current network transmission is in good conditions, and there is no packet loss or excessively long latency due to data packet queuing. In this case, if the current RTO is the RTO in the second or third retransmission mechanism, the RTO in the first retransmission mechanism that is more suitable for the current network transmission is used as an RTO of the data packet. If the current RTO is the RTO in the first retransmission mechanism, the RTO in the first retransmission mechanism continues to be used. (2) A data packet is retransmitted and an acknowledgement is received, which indicates that the acknowledgement corresponding to the data packet is received within a current RTO that starts after a specific retransmission of the data packet, where the acknowledgement corresponding to the data packet is a message returned by a receive end to a transmit end in response to receiving the data packet. When a case described in (2) occurs, it indicates that a packet loss may occur or latency may be excessively long due to request message queuing in current network transmission. In this case, if the current RTO is the RTO in the first retransmission mechanism, the RTO in the second retransmission mechanism that is more suitable for the current network transmission is used as an RTO of the data packet. If the current RTO is the RTO in the second retransmission mechanism, the RTO in the third retransmission mechanism that is more suitable for the current network transmission is used. If the current RTO is the RTO in the third retransmission mechanism, it indicates that congestion in the current network transmission is not alleviated, and the RTO in the third retransmission mechanism is still used.

The switching between the retransmission mechanisms may also be considered as adjustment of a period of a retransmission timer, which may be mutual adjustment of three periods, or may be modification based on a same period.

Figure 10A:
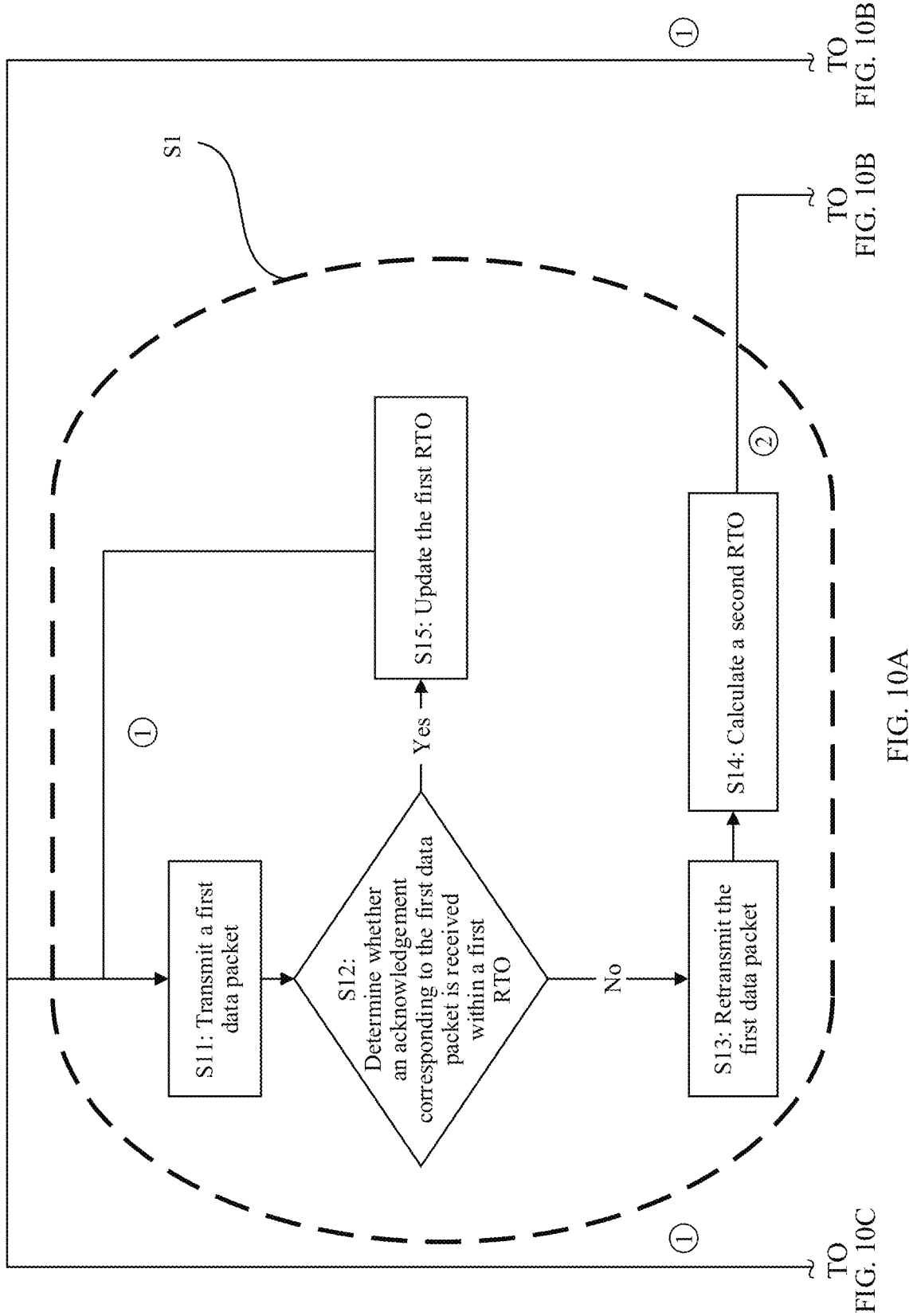
FIG. 10A, FIG. 10B and FIG. 10C are a flowchart of a retransmission control method according to an embodiment of the present invention.
Figure 10B:
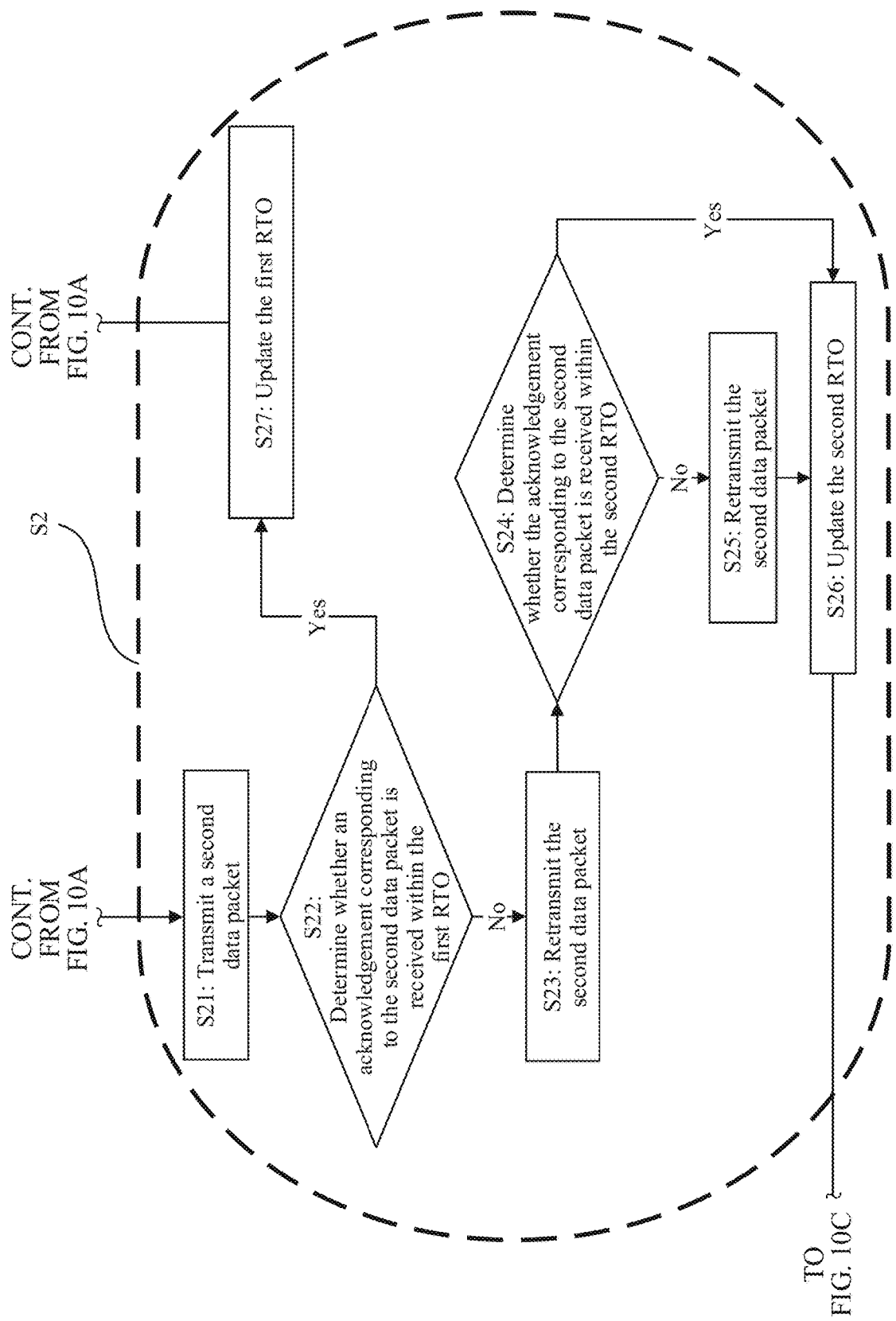

FIG. 10A, FIG. 10B and FIG. 10 C are a schematic flowchart corresponding to the schematic diagram of switching among the three retransmission mechanisms in FIG. 9. The meaning of (1) or (2) in FIG. 10A, FIG. 10B and FIG. 10 C is the same as that in FIG. 9.

The following describes in detail the retransmission control method provided in the embodiments of this application.

An embodiment of the present invention provides a retransmission control method (the first retransmission mechanism) shown in a dashed-line block S1 in FIG. 10A.

Operation S11: A transmit end transmits a first data packet to a receive end.

Operation S12: Determine whether an acknowledgement corresponding to the first data packet is received within a first RTO.

If the transmit end does not receive the acknowledgement corresponding to the first data packet within the first RTO, operation S13 is performed.

In an embodiment, if the transmit end receives the acknowledgement corresponding to the first data packet within the first RTO, operation S14 is performed.

In this case, if the first data packet is a first data packet transmitted by a retransmission control device after the retransmission control device is initialized, the first RTO may be a preset initial RTO, for example, 2s. If the retransmission control device has transmitted a data packet, and the retransmission control device has updated the first RTO according to the method provided in this embodiment, the first RTO mentioned in operation S12 is the updated first RTO. The transmit end determines whether the acknowledgement corresponding to the first data packet is received within the first RTO that starts after the first data packet is transmitted for the first time (original transmission). The acknowledgement indicates that the receive end has received the first data packet. In other words, the acknowledgement is a message returned by the receive end to the transmit end after the receive end receives the first data packet, so that the transmit end learns that the receive end has received the first data packet.

If the transmit end has not received the acknowledgement corresponding to the data packet when the first RTO that is set for a retransmission timer expires, operation S13 is performed.

Operation S15: If the transmit end receives the acknowledgement corresponding to the first data packet within the first RTO, the transmit end updates the first RTO, where the first RTO is updated based on a transmit timestamp of the first data packet and a receive timestamp of the acknowledgement corresponding to the first data packet.

If the transmit end receives the acknowledgement corresponding to the data packet before the first RTO that is set for the retransmission timer expires, the transmit end updates the first RTO, and adjusts a period of the retransmission timer to a value obtained after the updated first RTO is exponentially increased. The first RTO is calculated according to the calculation method of the first RTO in the description corresponding to FIG. 7. The updated first RTO is related to the transmit timestamp of the first data packet and the receive timestamp of the acknowledgement corresponding to the first data packet. The update of the first RTO is described in the foregoing part of FIG. 7, and details are not described herein again. A sample of a round-trip time required when no retransmission occurs is unambiguous and truly reflects a round-trip time required when network transmission is smooth. If all acknowledgements corresponding to a plurality of consecutive data packets that follow the first data packet are received within the first RTO (or the updated first RTO), the first RTO may be continuously updated.

In an embodiment, if the transmit end always receives an acknowledgement corresponding to a data packet within the first RTO (or the updated first RTO), it indicates that a network transmission status remains unchanged, network transmission efficiency is comparatively high, and congestion may not occur. In this case, a data packet retransmission may be performed according to the first retransmission mechanism provided by the embodiments of the present invention all the time. That is, the RTO of the retransmission timer is always set to a value obtained after the first RTO (fast-RTO) is exponentially increased: fast-RTO, fast-RTO× K, fast-RTO×K2, fast-RTO×K3, . . . , or fast-RTO×Ki. K is a number greater than 1, and K may be 2. After the data packet is retransmitted for the $i^{th}$ time, if the transmit end does not receive the acknowledgement corresponding to the first data packet within fast-RTO×Ki, the transmit end retransmits the first data packet, where i is a positive integer. In this retransmission control method, an actual round-trip time can be fully considered, which avoids unnecessary data packet retransmission.

In an embodiment, operation S15 may alternatively be performed before operation S12. In other words, after transmitting a data packet, the transmit end may update the first RTO when receiving an acknowledgement corresponding to the data packet within any RTO. Any RTO herein may be the initial RTO, the first RTO, a second RTO, or another RTO value that is set.

Operation S13: If the transmit end does not receive the acknowledgement corresponding to the first data packet within the first RTO, the transmit end retransmits the first data packet.

After retransmitting (transmitting again) the first data packet one or more times, the transmit end finally receives the acknowledgement corresponding to the first data packet before the RTO that is set for the retransmission timer expires. An RTO for a first retransmission and an RTO for a subsequent retransmission that are set for the retransmission timer may be a value obtained after the first RTO (fast-RTO) is exponentially increased: fast-RTO×K, fast-RTO×K2, fast-RTO×K3, . . . , or fast-RTO×Ki. K is a number greater than 1, and K may be 2. After the data packet is retransmitted for the $i^{th}$ time, if the transmit end does not receive the acknowledgement corresponding to the first data packet within fast-RTO×Ki, the transmit end retransmits the first data packet, where i is a positive integer.

In an embodiment, an RTO for a first retransmission and an RTO for a subsequent retransmission may be a value obtained after the RTO is exponentially increased: RTO×K, RTO×K2, RTO×K3, . . . , or RTO×Ki. K is a number greater than 0, and K may be 2. After the data packet is retransmitted for the $i^{th}$ time, if the transmit end does not receive an acknowledgement corresponding to a second data packet within RTO×Ki, the transmit end retransmits the second data packet, where i is a positive integer greater than or equal to 2, and the RTO may be an RTO calculated based on the first RTO and the second RTO, or may be a preset RTO.

In an embodiment, the data packet may be retransmitted a plurality of times until the transmit end receives the acknowledgement corresponding to the data packet. In an embodiment, a maximum quantity of retransmissions may further be set. When a quantity of retransmissions reach the maximum quantity of retransmissions, retransmission of the data packet is abandoned.

Operation S14: Calculate the second RTO.

The second RTO is related to the receive timestamp of the acknowledgement corresponding to the first data packet and a transmit timestamp of the first data packet. In this case, if a second RTO obtained through previous calculation already exists, the second RTO is updated. The second RTO may be calculated based on a round-trip time required when a retransmission occurs, where the round-trip time is counted in the second RTO method in the foregoing description corresponding to FIG. 8.

In an embodiment, the second RTO calculated may be used to replace the original second RTO.

In an embodiment, the second RTO is a time difference between the receive timestamp of the acknowledgement corresponding to the first data packet and the transmit timestamp of the first data packet.

In an embodiment, the second RTO is a product of a second coefficient and a time difference between the transmit timestamp of the first data packet and the receive timestamp of the acknowledgement corresponding to the first data packet, where a value of the second coefficient is greater than 0. Specifically, the second coefficient may be 1.5.

The first RTO is related to latency that exists when network transmission is smooth. If no acknowledgement is received within the first RTO, that no acknowledgement is received may be caused by congestion in network transmission, and may not be merely caused by the latency. In this case, a network transmission status may change, and congestion may occur in the network transmission.

In an embodiment, in the retransmission control method provided in this embodiment of the present invention, the retransmission mechanism may be changed to adapt to a current network transmission status. The original first retransmission mechanism is changed to the second retransmission mechanism to flexibly adapt to a change in the network transmission status, to reduce unnecessary retransmission and shorten time required for data packet transmission. In other words, to adapt to the current network transmission status, the second RTO is considered as an RTO used when the transmit end transmits a next data packet. The RTO that is set for the retransmission timer may be adjusted, and the period of the retransmission timer is adjusted to the second RTO. That is, after operation S14, a method shown in a dashed-line block S2 in FIG. 10B may be performed: retransmitting the second data packet based on the second RTO, where the second data packet is a data packet transmitted by the transmit end after the transmit end transmits the first data packet, and may be a data packet next to be transmitted after the first data packet is transmitted, or may be a data packet that is transmitted after the acknowledgement corresponding to the first data packet is received.

The following describes in detail a specific procedure of the method S2 shown in the dashed-line block S2 in FIG. 10B, that is, the second retransmission mechanism.

Operation S21: The transmit end transmits the second data packet to the receive end.

Operation S22: Determine whether an acknowledgement corresponding to the second data packet is received within the first RTO.

If the transmit end does not receive the acknowledgement corresponding to the second data packet within the first RTO, operation S23 is performed.

In an embodiment, if the transmit end receives the acknowledgement corresponding to the second data packet within the first RTO, operation S27 is performed.

The transmit end determines whether the acknowledgement corresponding to the second data packet is received within the first RTO that starts after the second data packet is transmitted for the first time (original transmission). The acknowledgement indicates that the receive end has received the second data packet. In other words, the acknowledgement is a message returned by the receive end to the transmit end after the receive end receives the second data packet, so that the transmit end learns that the receive end has received the second data packet.

If the transmit end has not received the acknowledgement corresponding to the data packet when the retransmission timer expires (within the first RTO), operation S23 is performed.

Operation S27: Update the first RTO based on a transmit timestamp of the second data packet and a receive timestamp of the acknowledgement corresponding to the second data packet.

The updated first RTO is calculated according to the calculation method of the first RTO in the description corresponding to FIG. 7. The updated first RTO is related to the transmit timestamp of the second data packet and the receive timestamp of the acknowledgement corresponding to the second data packet. A new round-trip time required when no retransmission occurs is calculated based on the transmit timestamp of the second data packet and the receive timestamp of the acknowledgement corresponding to the second data packet, to obtain a new unambiguous RTT sample. Calculation of the first RTO is described in the foregoing part of FIG. 7, and details are not described herein again. The sample of the round-trip time required when no retransmission occurs is unambiguous and truly reflects the round-trip time required when network transmission is smooth.

In this case, data packet transmission without retransmission occurs once in the second retransmission mechanism, which indicates that congestion in network transmission is alleviated, and a comparatively smooth network transmission status may be resumed. In this case, the currently used second retransmission control method or the RTO of the current retransmission timer cannot well adapt to the current network transmission status. The current second retransmission mechanism may be switched to the first retransmission mechanism, and the period of the retransmission timer is adjusted to the first RTO. A retransmission is performed based on the retransmission timer that uses a value obtained after the updated first RTO is exponentially increased, so that a data packet that needs to be retransmitted is retransmitted as soon as possible, and overall transmission time of the data packet is reduced.

Therefore, in an embodiment, after operation S27, operations in the dashed-line block S1 in FIG. 10A, namely, operations S11 to S15, are performed. When the transmit end transmits a third data packet to the receive end, the RTO used by the retransmission timer is a value obtained after the first RTO (fast-RTO) is exponentially increased: fast-RTO, fast-RTO×K, fast-RTO×K2, fast-RTO×K3, . . . , or fast-RTO×Ki. K is a number greater than 1, and K may be 2. After the data packet is retransmitted for the time, if the transmit end does not receive an acknowledgement corresponding to the data packet within fast-RTO×Ki, the transmit end retransmits the data packet, where i is a positive integer. The third data packet is a data packet transmitted by the transmit end after the transmit end transmits the second data packet, and may be a data packet next to be transmitted after the second data packet is transmitted, or may be a data packet that is transmitted after the acknowledgement corresponding to the second data packet is received. As shown in FIG. 10A and FIG. 10B, S1 and S2 may be mutually switched, to flexibly adapt to a change in the network transmission status, reduce unnecessary retransmission, and shorten time required for data packet transmission.

Operation S23: If the transmit end does not receive the acknowledgement corresponding to the second data packet within the first RTO, the transmit end retransmits the second data packet.

In this case, the first RTO is used as an RTO for a first transmission (original transmission) of a data packet, to avoid unnecessary retransmission that occurs because the RTO is less than actual network latency. If no acknowledgement is received within the first RTO, the data packet is retransmitted for the first time.

Operation S24: Determine whether the acknowledgement corresponding to the second data packet is received by the transmit end within the second RTO.

The transmit end determines whether the acknowledgement corresponding to the second data packet is received within the second RTO that starts after the first retransmission. In other words, an RTO for the first retransmission is the second RTO (or referred to as slow-RTO). The acknowledgement indicates that the receive end has received the second data packet. In other words, the acknowledgement is a message returned by the receive end to the transmit end after the receive end receives the second data packet, so that the transmit end learns that the receive end has received the second data packet.

In another embodiment, operation S24: Determine whether the transmit end receives the acknowledgement corresponding to the second data packet within the second RTO, where the second RTO is greater than a product of the first RTO and K, and K is a number greater than 1. Specifically, K may be 2, that is, the RTO for the first retransmission is a maximum value between slow-RTO and fast-RTO×K, namely, a solution of max(slow-RTO, fast-RTO×K). When the maximum value between slow-RTO and fast-RTO×K is used, a case in which current network transmission is worst is considered, to avoid unnecessary retransmission.

If the transmit end does not receive the acknowledgement corresponding to the second data packet within the second RTO, operation S25 is performed. If the transmit end receives the acknowledgement corresponding to the second data packet within the second RTO, operation S26 is performed.

Operation S25: Retransmit the second data packet.

In this case, the second data packet is retransmitted for the second time. Then, after retransmitting (transmitting again) the second data packet one or more times, the transmit end finally receives the acknowledgement corresponding to the second data packet.

In an embodiment, an RTO for the second retransmission and an RTO for a subsequent retransmission may be a value obtained after the first RTO is exponentially increased: fast-RTO×K2, fast-RTO×K3, . . . , or fast-RTO×Ki. K is a number greater than 1, and K may be 2. After the data packet is retransmitted for the $i^{th}$ time, if the transmit end does not receive the acknowledgement corresponding to the second data packet within fast-RTO×Ki, the transmit end retransmits the second data packet, where i is a positive integer greater than or equal to 2.

For example, after the transmit end transmits a data packet P1 for the first time, the first RTO is used as an RTO for original transmission of the data packet P1. If the transmit end determines that no acknowledgement is received within the first RTO (when the retransmission timer expires), the transmit end performs a first retransmission of P1. For example, the second RTO is used as an RTO for the first retransmission of P1. If the transmit end does not receive the acknowledgement within max(slow-RTO, fast-RTO×K) or within slow-RTO (the second RTO), that is, the retransmission timer expires, the transmit end performs a second retransmission of P1. If a request message requires a third retransmission, fast-RTO×K2 is used as an RTO for the third retransmission. If the transmit end does not receive the acknowledgement within fast-RTO×K2, the transmit end performs a fourth retransmission of P1.

In an embodiment, an RTO for the second retransmission and an RTO for a subsequent retransmission may be a value obtained after the RTO is exponentially increased: RTO×K2, RTO×K3, . . . , or RTO×Ki. K is a number greater than 1, and K may be 2. After the data packet is retransmitted for the $i^{th}$ time, if the transmit end does not receive the acknowledgement corresponding to the second data packet within RTO× Ki, the transmit end retransmits the second data packet, where i is a positive integer greater than or equal to 2, and the RTO may be an RTO calculated based on the first RTO and the second RTO, or may be a preset RTO.

In an embodiment, the data packet may be retransmitted a plurality of times until the transmit end receives the acknowledgement corresponding to the data packet. In an embodiment, a maximum quantity of retransmissions may further be set. When a quantity of retransmissions reach the maximum quantity of retransmissions, retransmission of the data packet is abandoned.

The first RTO (fast-RTO) is used as a value of the RTO for the first transmission (original transmission). In this case, an actual round-trip time is considered, and unnecessary retransmission is avoided. Once no acknowledgement corresponding to the data packet in the original transmission is received within the first RTO, a round-trip time required when a retransmission occurs is fully considered, to avoid unnecessary retransmission due to excessively long latency that is caused by network congestion, thereby effectively alleviating the network congestion.

Operation S26: Update the second RTO.

The updated second RTO is related to the receive timestamp of the acknowledgement corresponding to the second data packet and the transmit timestamp of the second data packet.

Specifically, the updated second RTO may be calculated based on a round-trip time required when a retransmission occurs, where the round-trip time is counted in the calculation method of the second RTO in the foregoing description corresponding to FIG. 8.

In an embodiment, the second RTO calculated may replace the original second RTO.

In an embodiment, the second RTO is a time difference between the receive timestamp of the acknowledgement corresponding to the first data packet and the transmit timestamp of the first data packet.

In an embodiment, the second RTO is a product of a second coefficient and a time difference between the transmit timestamp of the first data packet and the receive timestamp of the acknowledgement corresponding to the first data packet, where a value of the second coefficient is greater than 0. Specifically, the second coefficient may be 1.5.

Figure 10C:
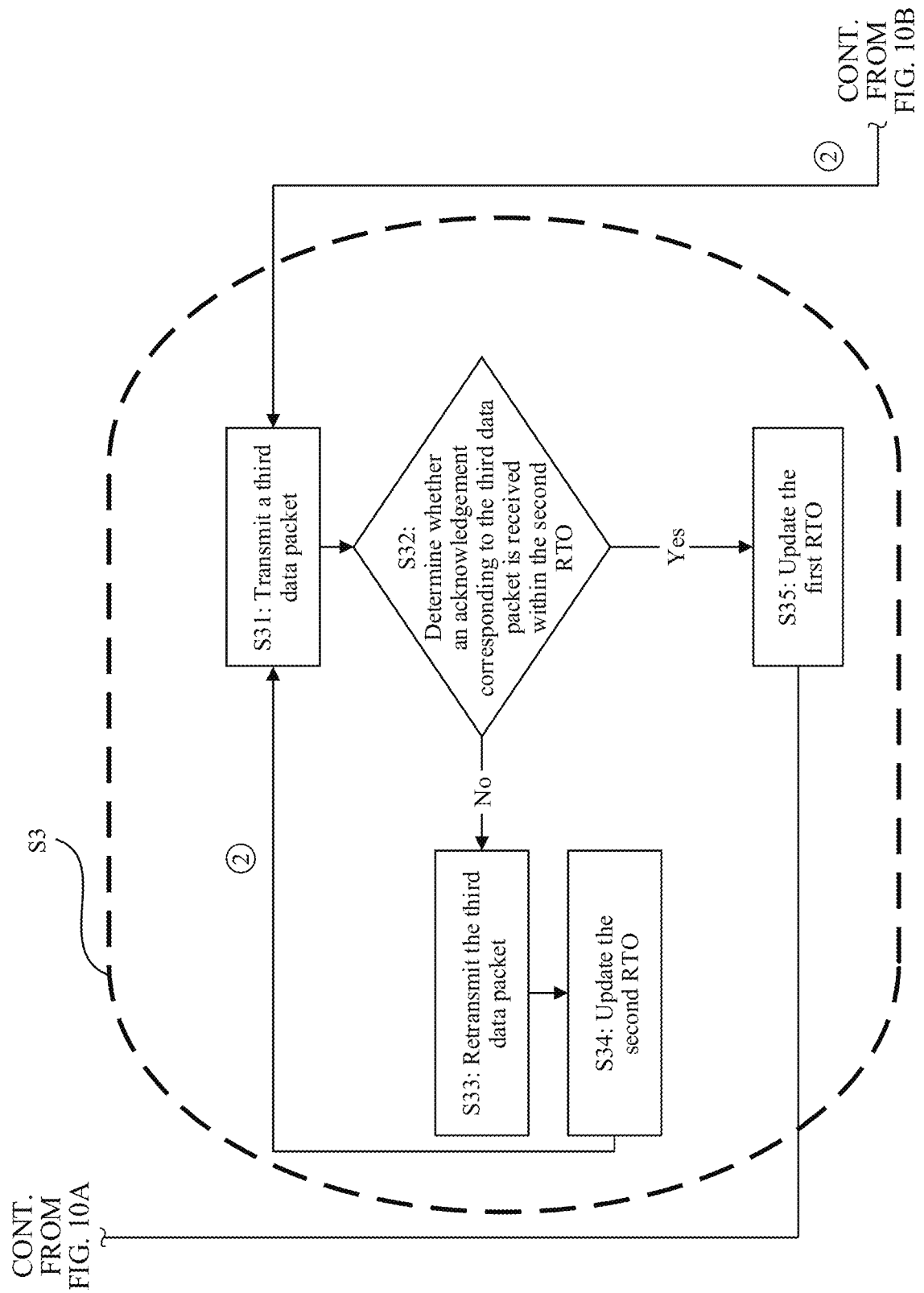

In this case, a data packet retransmission still occurs in the second retransmission mechanism. After the retransmission is performed based on the RTO that is set in the second retransmission mechanism, network congestion is not alleviated. This indicates that current network congestion is still severe, and consecutive packet losses or quite long latency due to queuing occurs. The current RTO of the retransmission timer cannot ensure best data packet transmission behavior of the transmit end. Therefore, the retransmission mechanism is changed to adapt to a current network transmission status, and the original second retransmission mechanism is changed to the third retransmission mechanism. In other words, to adapt to the current network transmission status, the RTO of the retransmission timer is adjusted, and the period of the retransmission timer is adjusted to the updated second RTO. After operation S26, a method shown in a dashed-line block S3 in FIG. 10C is performed: The transmit end transmits the third data packet to the receive end, and if the transmit end does not receive an acknowledgement corresponding to the third data packet within the second RTO, the transmit end retransmits the third data packet. The third data packet is a data packet transmitted by the transmit end after the transmit end transmits the second data packet, and may be a data packet next to be transmitted after the second data packet is transmitted, or may be a data packet that is transmitted after the acknowledgement corresponding to the second data packet is received.

The following describes in detail the retransmission control method shown in the dashed-line block S3 in FIG. 10C, namely, the third retransmission mechanism.

Operation S31: The transmit end transmits the third data packet to the receive end.

Operation S32: Determine whether the acknowledgement corresponding to the third data packet is received within the second RTO.

If the transmit end does not receive the acknowledgement corresponding to the third data packet within the second RTO, operation S33 is performed.

In an embodiment, if the transmit end receives the acknowledgement corresponding to the third data packet within the second RTO, operation S35 is performed.

The transmit end determines whether the acknowledgement corresponding to the third data packet is received within the second RTO that starts after the third data packet is transmitted for the first time (original transmission). The acknowledgement indicates that the receive end has received the third data packet. In other words, the acknowledgement is a message returned by the receive end to the transmit end after the receive end receives the third data packet, so that the transmit end learns that the receive end has received the third data packet.

If the transmit end has not received the acknowledgement corresponding to the data packet when the retransmission timer expires (within the second RTO), operation S33 is performed.

Operation S35: If the transmit end receives the acknowledgement corresponding to the third data packet within the second RTO, the transmit end updates the first RTO.

The updated first RTO is calculated according to the calculation method of the first RTO in the description corresponding to FIG. 7. The updated first RTO is related to a transmit timestamp of the third data packet and a receive timestamp of the acknowledgement corresponding to the third data packet. A new round-trip time required when no retransmission occurs is calculated based on the transmit timestamp of the third data packet and the receive timestamp of the acknowledgement corresponding to the third data packet, to obtain a new unambiguous RTT sample. The update of the first RTO is described in the foregoing part of FIG. 7, and details are not described herein again. The sample of the round-trip time required when no retransmission occurs is unambiguous and truly reflects the round-trip time required when network transmission is smooth.

In this case, data packet transmission without retransmission occurs once in the third retransmission mechanism, which indicates that congestion in network transmission is alleviated, and a comparatively smooth network transmission status may be resumed. In this case, the currently used third retransmission control method or the currently used RTO cannot well adapt to the current network transmission status. The current third retransmission mechanism may be switched to the first retransmission mechanism, and the period of the retransmission timer is adjusted to the updated first RTO. The updated first RTO is used as a basis for exponential backoff, so that a data packet that needs to be retransmitted is retransmitted as soon as possible, and overall transmission time of the data packet is reduced.

Therefore, in an embodiment, after operation S35, operations in the dashed-line block S1 in FIG. 10A, namely, operations S11 to S15, may be performed. When the transmit end transmits a fourth data packet to the receive end, the RTO used is a value obtained after the first RTO (fast-RTO) is exponentially increased: fast-RTO, fast-RTO×K, fast-RTO×K2, fast-RTO×K3, . . . , or fast-RTO×Ki. K is a number greater than 1, and K may be 2. After the data packet is retransmitted for the $i^{th}$ time, if the transmit end does not receive an acknowledgement corresponding to the data packet within fast-RTO×Ki, the transmit end retransmits the data packet, where i is a positive integer. The fourth data packet is a data packet transmitted by the transmit end after the transmit end transmits the third data packet, and may be a data packet next to be transmitted after the third data packet is transmitted, or may be a data packet that is transmitted after the acknowledgement corresponding to the third data packet is received. RTO switching can implement flexible adaptation to a change in the network transmission status, reduce unnecessary retransmission, and shorten time required for data packet transmission.

Operation S33: If the transmit end does not receive the acknowledgement corresponding to the third data packet within the second RTO, the transmit end retransmits the third data packet.

After retransmitting (transmitting again) the third data packet one or more times, the transmit end finally receives the acknowledgement corresponding to the first data packet. An RTO for a first retransmission and an RTO for a subsequent retransmission may be a value obtained after the RTO (fast-RTO) is exponentially increased: fast-RTO×K, fast-RTO×K2, fast-RTO×K3, . . . , or fast-RTO×Ki. K is a number greater than 1, and K may be 2. After the data packet is retransmitted for the $i^{th}$ time, if the transmit end does not receive the acknowledgement corresponding to the first data packet within fast-RTO×Ki, the transmit end retransmits the first data packet, where i is a positive integer, and an RTO for the $i^{th}$ retransmission is fast-RTO×Ki.

In an embodiment, an RTO for a first retransmission and an RTO for a subsequent retransmission may be a value obtained after the RTO is exponentially increased: RTO×K, RTO×K2, RTO×K3, . . . , or RTO×Ki. K is a number greater than 1, and K may be 2. After the data packet is retransmitted for the $i^{th}$ time, if the transmit end does not receive the acknowledgement corresponding to the second data packet within RTO×Ki, the transmit end retransmits the second data packet, where i is a positive integer, and the RTO may be an RTO calculated based on the first RTO and the second RTO, or may be a preset RTO.

For example, after the transmit end transmits a data packet for the first time, if the transmit end does not receive an acknowledgement within the second RTO, the transmit end retransmits the data packet for the first time. An RTO for the first retransmission is fast-RTO×K. If the transmit end does not receive the acknowledgement within fast-RTO×K after retransmitting the data packet for the first time, the transmit end retransmits the data packet for the second time.

An RTO for the second retransmission is fast-RTO×K2. If the transmit end does not receive the acknowledgement within fast-RTO×K2 after retransmitting the data packet for the second time, the transmit end retransmits the data packet for the third time.

When the retransmission timer expires and the transmit end has not received the acknowledgement message, the transmit end retransmits the third data packet.

Operation S34: Update the second RTO.

The updated second RTO is related to the receive timestamp of the acknowledgement corresponding to the third data packet and the transmit timestamp of the third data packet. Specifically, the updated second RTO may be calculated based on a round-trip time required when a retransmission occurs, where the round-trip time is counted in the calculation method of the second RTO in the foregoing description corresponding to FIG. 8.

In an embodiment, the second RTO calculated may replace the original second RTO.

In an embodiment, the second RTO is a time difference between the receive timestamp of the acknowledgement corresponding to the third data packet and the transmit timestamp of the third data packet.

In an embodiment, the second RTO is a product of a second coefficient and a time difference between the transmit timestamp of the third data packet and the receive timestamp of the acknowledgement corresponding to the third data packet, where a value of the second coefficient is greater than 0. Specifically, the second coefficient may be 1.5.

In this case, a request message retransmission still occurs in the third retransmission mechanism. After backoff is performed according to the third retransmission mechanism, network congestion is not alleviated. This indicates that current network congestion is still severe, the network congestion is not alleviated, and consecutive packet losses or long latency due to queuing occurs. The third retransmission mechanism needs to be maintained, and the period of the retransmission timer is adjusted to the updated second RTO, until a message exchange without retransmission is transmitted, the period of the retransmission timer is adjusted to the updated first RTO. That is, retransmission control continues to be performed according to operations S31 to S35 shown in the dashed-line block S3 in FIG. 10C. To be specific, the transmit end transmits the fourth data packet to the receive end. If the transmit end does not receive an acknowledgement corresponding to the fourth data packet within the updated second RTO, the transmit end retransmits the fourth data packet. The fourth data packet is a data packet transmitted by the transmit end after the transmit end transmits the third data packet, and may be a data packet next to be transmitted after the third data packet is transmitted, or may be a data packet that is transmitted after the acknowledgement corresponding to the third data packet is received.

The following describes the switching among the three retransmission mechanisms by using specific examples.

Figure 11:
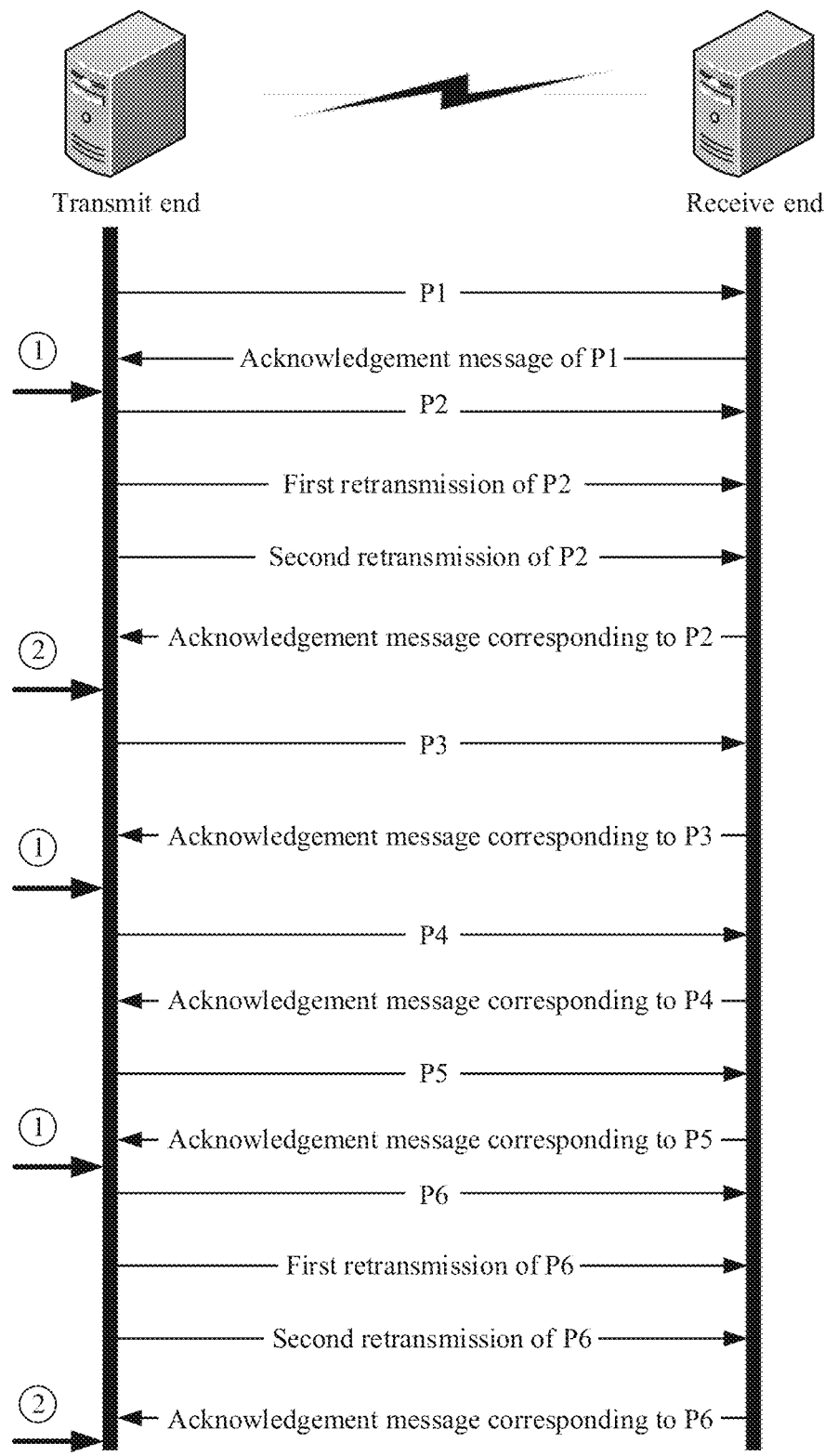
FIG. 11 is a schematic diagram of retransmission mechanism switching according to an embodiment of the present invention.

For example, as shown in FIG. 11, a transmit end transmits a data packet P1 to a receive end, and a receiving unit of the transmit end receives an acknowledgement corresponding to P1 before a retransmission timer expires. Herein, an RTO used for retransmission may be an RTO in the first retransmission mechanism, the second retransmission mechanism, or the third retransmission mechanism, or may be an initial RTO during initialization. After transmitting the data packet P1, the transmit end receives an acknowledgement without retransmission, that is, a case described in (1) in FIG. 9 occurs: An acknowledgement message is received after a first transmission. In this case, the first retransmission mechanism is suitable for a current network transmission status, and a current retransmission mechanism is switched to the first retransmission mechanism (if the current retransmission mechanism is the first retransmission mechanism already, the current retransmission mechanism remains unchanged). In addition, a first RTO may be updated based on a round-trip time required when no retransmission occurs, and a period of the retransmission timer is adjusted to the updated first RTO.

After the first retransmission mechanism is switched, the transmit end transmits a data packet P2 to the receive end, and the transmit end does not receive an acknowledgement corresponding to P2 before the retransmission timer expires. Herein, that the retransmission timer expires indicates that a time difference between a transmit timestamp for transmitting P2 and a current timestamp is greater than the first RTO. After retransmitting P2 twice, the transmit end receives an acknowledgement corresponding to P2, that is, a case described in (2) in FIG. 9 occurs: An acknowledgement message is received after a retransmission occurs. In this case, the second retransmission mechanism is suitable for the current network transmission status, and the current first retransmission mechanism is switched to the second retransmission mechanism. In addition, a second RTO may be calculated based on a round-trip time required when a retransmission occurs, and the period of the retransmission timer is adjusted to the second RTO. Subsequent data packet transmission is performed based on the second RTO.

After the second retransmission mechanism is switched, the transmit end transmits a data packet P3 to the receive end, and the transmit end receives an acknowledgement corresponding to P3 before the retransmission timer expires (within the first RTO). That is, the case described in (1) in FIG. 9 occurs: An acknowledgement is received after a first transmission. In this case, the first retransmission mechanism is suitable for the current network transmission status, and the current second retransmission mechanism is switched to the first retransmission mechanism. In addition, the first RTO may be updated based on a round-trip time required when no retransmission occurs, and the period of the retransmission timer is adjusted to the updated first RTO.

After the first retransmission mechanism is switched, the transmit end sequentially transmits data packets P4 and P5 to the receive end, and receives acknowledgements corresponding to both data packets before the retransmission timer expires (within the first RTO). That is, the case described in (1) in FIG. 9 occurs: An acknowledgement is received after a first transmission. In this case, the first retransmission mechanism remains unchanged. In addition, the first RTO may be updated based on a round-trip time required when no retransmission occurs, and the period of the retransmission timer is adjusted to the updated first RTO. After the transmit end transmits a data packet P6 to the receive end, the transmit end does not receive an acknowledgement before the retransmission timer expires. In this case, a retransmission is performed. Therefore, the first retransmission mechanism is switched to the second retransmission mechanism again.

Figure 12:
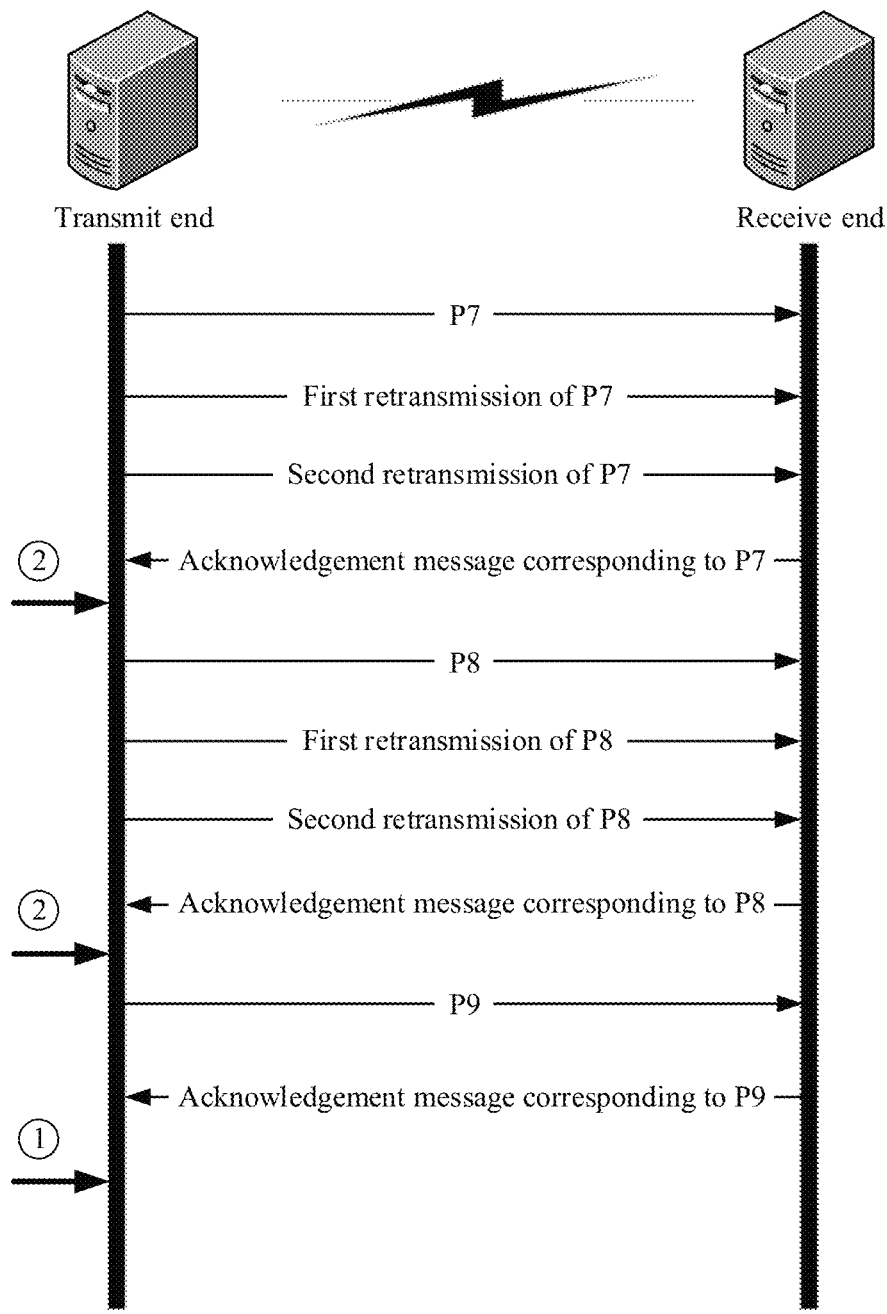
FIG. 12 is a schematic diagram of retransmission mechanism switching according to an embodiment of the present invention.

Then, in FIG. 11, the transmit end receives the acknowledgement corresponding to the data packet P6. As shown in FIG. 12, the transmit end transmits a data packet P7 to the receive end, and the transmit end does not receive an acknowledgement corresponding to P7 before the retransmission timer expires (within the first RTO). The RTO herein is an RTO that is set in the second retransmission mechanism. After retransmitting P7 twice, the transmit end receives the acknowledgement corresponding to P7, that is, the case described in (2) in FIG. 9 occurs: An acknowledgement is received after a retransmission occurs. In this case, the third retransmission mechanism is suitable for the current network transmission status, and the current second retransmission mechanism is switched to the third retransmission mechanism. Subsequently, a retransmission is performed based on an RTO that is set in the third retransmission mechanism. In addition, the second RTO may be updated based on a round-trip time required when a retransmission occurs, and the period of the retransmission timer is adjusted to the updated second RTO.

After the third retransmission mechanism is switched to, the transmit end transmits a data packet P8 to the receive end, and the transmit end receives an acknowledgement corresponding to P8 before the retransmission timer expires (within the second RTO). That is, the case described in (2) in FIG. 9 occurs: An acknowledgement is received after a retransmission occurs. In this case, the third retransmission mechanism is still suitable for the current network transmission status. The second RTO is updated based on a round-trip time required when a retransmission occurs, and the period of the retransmission timer is adjusted to the updated second RTO.

Still in the third retransmission mechanism, the transmit end transmits a request message P9 to the receive end in this case, and the transmit end receives an acknowledgement corresponding to P9 before the retransmission timer expires (within the second RTO). That is, the case described in (1) in FIG. 9 occurs: An acknowledgement message is received when no retransmission occurs. In this case, the first retransmission mechanism is suitable for the current network transmission status. The first RTO may be updated based on a round-trip time required when no retransmission occurs, and the period of the retransmission timer is adjusted to the updated first RTO. Subsequently, a retransmission is performed based on an RTO that is set in the first retransmission mechanism.

In the foregoing calculation of the round-trip time required when a retransmission occurs, after the acknowledgement is received upon a retransmission of the data packet, an obtained RTT sample may be ambiguous. Therefore, measurement of the RTT and further estimation of a value of a slow retransmission time may be affected. Therefore, an embodiment of this application provides a data transmission method, to determine whether an acknowledgement is in response to original transmission of a received data packet or in response to a specific retransmission of the received data packet, thereby helping obtain round-trip times required when a data packet is transmitted and retransmitted. Therefore, when a retransmission is performed when network congestion or a packet loss occurs, a second RTO can also be accurately calculated.

Figures 13, 14:
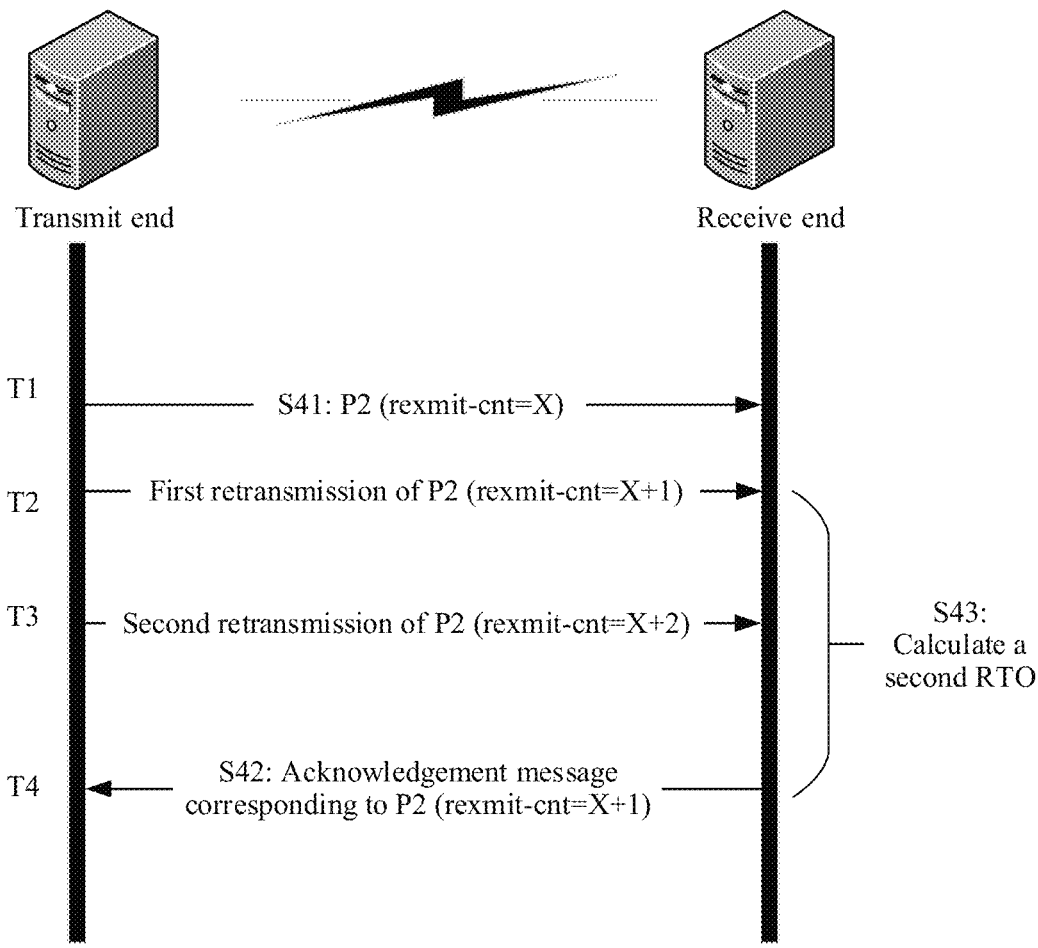
FIG. 13 is a schematic diagram of a retransmission control method according to an embodiment of the present invention.
FIG. 14 is a schematic diagram of a retransmission count option according to an embodiment of the present invention.

A procedure of the data transmission method provided in the embodiment of this application is shown in FIG. 13, and includes the following operations.

Operation 41: A transmit end transmits a data packet to a receive end, where the data packet carries a retransmission sequence number, and the retransmission sequence number is used to indicate a quantity of times the data packet is transmitted.

In an embodiment, the data packet includes an extension field, and the extension field carries the retransmission sequence number. The extension field may be referred to as a retransmission count option, and the retransmission count option may be used to determine whether an acknowledgement is in response to original transmission of the data packet or is in response to a specific retransmission of the data packet. However, the retransmission count option cannot be used in an empty message or a reset message because some protocols, such as the CoAP protocol, do not allow adding an option to an empty message.

A format of the retransmission count option is shown in FIG. 14, and may be named rexmit-cnt. A value of the retransmission count option is a variable-size unsigned integer with a length of 0 to 1 byte, and 1 byte is recommended. A field number of rexmit-cnt may be a corresponding allocated field. The retransmission count option may be carried in both a request message and an acknowledgement message. When the retransmission count option is present in the request message, the retransmission count option indicates a sequence number of transmission of the request message or a transmission sequence of the request message.

For original transmission of the request message, a retransmission sequence number N may be X, and specifically, may be represented by a number 0. The request message in the original transmission to the receive end may carry a number 255 (0xFF) that may be interpreted as the number 0 for the original transmission.

In an embodiment, the retransmission sequence number is in an existing field in the data packet, for example, may be in extended semantics of a token field in a data packet. A token is a local identifier, and the transmit end may use different token values to distinguish between the original transmission and a plurality of retransmissions of the request message.

The retransmission sequence number is used to indicate the quantity of times the data packet is transmitted. Specifically, for a same data packet, a retransmission sequence number carried in the data packet when the data packet is transmitted for the first time (original transmission) is different from a retransmission sequence number carried in the data packet when the data packet is retransmitted each time, and retransmission sequence numbers carried in the data packet in different retransmissions are also different. The retransmission sequence number carried in the data packet when the data packet is transmitted/retransmitted needs to be globally unique. That is, a retransmission sequence number carried in a request message transmitted for the first time is different from a retransmission sequence number carried in the retransmitted request message in a plurality of retransmissions. The retransmission sequence number may be a value that monotonically increases, monotonically decreases, or proportionally increases.

In an embodiment, as shown in FIG. 13, the retransmission sequence number carried in the data packet is increased by 1 for each retransmission. For example, when the data packet is transmitted for the first time, the retransmission sequence number carried in the data packet is X, then the retransmission sequence number carried in the retransmitted request message is X+1 during the first transmission of the data packet, and the retransmission sequence number carried in the data packet is X+2 during a second transmission of the data packet.

In an embodiment, the transmit end stores a timestamp generated when the request message is transmitted for the first time and a timestamp generated when the request message is retransmitted each time. For example, in FIG. 13, the timestamp of the first transmission is T1, and timestamps of a first retransmission and a second retransmission are T2 and T3.

Operation 42: The receive end receives the data packet transmitted by the transmit end, and the receive end returns an acknowledgement corresponding to the data packet to the transmit end, where the acknowledgement carries a retransmission sequence number that is the same as the retransmission sequence number in the data packet corresponding to the acknowledgement.

If the receive end supports (can be implemented) a retransmission sequence number, and the retransmission sequence number exists in the received data packet, the acknowledgement returned by the receive end carries the retransmission sequence number that is the same as the retransmission sequence number carried in the received data packet. If the receive end needs to return an empty acknowledgement, the receive end carries the retransmission sequence number in an acknowledgement that is corresponding to the data packet and that is returned later.

Operation 43: The transmit end receives the acknowledgement returned by the receive end, where the acknowledgement carries the retransmission sequence number that is the same as the retransmission sequence number in the data packet corresponding to the acknowledgement. A second RTO is a time difference between a receive timestamp of the acknowledgement received by the transmit end and a transmit timestamp of the data packet corresponding to the acknowledgement.

When the acknowledgement carrying the retransmission sequence number arrives, the transmit end finds, by using the retransmission sequence number carried in the acknowledgement, a transmit timestamp of a data packet that has the same retransmission sequence number as the acknowledgement. For example, as shown in FIG. 13, the transmit end receives the acknowledgement corresponding to P2, where a retransmission sequence number carried in the acknowledgement is X+2, and X+2 is a retransmission sequence number in the data packet retransmitted for the second time. Therefore, the acknowledgement is an acknowledgement returned by the receive end in response to receiving the data packet retransmitted for the second time. If a receive timestamp of the acknowledgement received by the transmit end is T4, a value of an obtained RTT sample is a time difference between the receive timestamp of the acknowledgement and a transmit timestamp of the data packet retransmitted for the second time. The obtained RTT sample is the foregoing round-trip time required when a retransmission occurs, and may be used for calculating and updating the second RTO.

Once the transmit end receives the acknowledgement carrying the retransmission sequence number from the receive end, the transmit end may learn of whether the receive end supports (can be implemented) the retransmission sequence number. If an acknowledgement that is corresponding to a data packet and that is transmitted by the receive end during initialization carries a retransmission sequence number, the transmit end learns that the receive end supports the retransmission sequence number, and carries the retransmission sequence number in subsequent data packet transmission. A data packet in original transmission may carry a retransmission sequence number 0. Specifically, a zero-byte integer may be transmitted according to a CoAP encoding rule. If the received acknowledgement does not include a retransmission sequence number, the transmit end may suspend adding the retransmission sequence number to a data packet and transmitting the data packet to the receive end. If the data packet transmitted by the transmit end does not carry a retransmission sequence number, but the received acknowledgement carries a retransmission sequence number, the transmit end needs to ignore the retransmission sequence number in the acknowledgement.

When a current second RTO is calculated by using the retransmission sequence number, the current second RTO further needs to be compared with a value of the RTT sample obtained in previous data packet transmission in which a retransmission occurs. A maximum value between the current second RTO calculated and the value of the previous RTT sample is used as a latest second RTO. If no previous RTT sample is available (for example, the receive end returns an empty acknowledgement), the current second RTO calculated is directly used as the second RTO.

Figure 15:
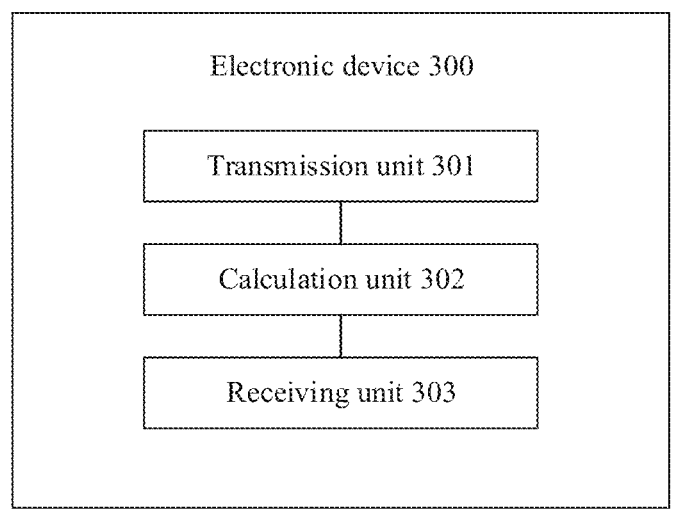
FIG. 15 is a schematic structural diagram of an electronic device according to an embodiment of the present invention.

Based on the foregoing embodiments, an embodiment of this application further provides an electronic device 300. As shown in FIG. 15, the electronic device 300 includes a transmission unit 301, a calculation unit 302, and a receiving unit 303.

The transmission unit 301 is configured to transmit a data packet to a receive end, and is further configured to retransmit the data packet to the receive end. Specifically, the transmission unit 301 may be configured to perform operations S11, S13, S21, S23, S25, S31, S33, and S34 in the foregoing embodiments.

The calculation unit 302 is configured to update a first RTO, and is further configured to calculate or update a second RTO. Specifically, the calculation unit 302 may be configured to perform operations S14, S15, S26, S27, and S35 in the foregoing embodiments.

The receiving unit 303 is configured to receive an acknowledgement corresponding to the data packet, where the acknowledgement is information transmitted by the receive end in response to receiving the data packet.

Based on the foregoing embodiments, an embodiment of this application further provides a communications interface. The communications interface includes an input/output port and a processor. The processor may implement the retransmission control method provided in any one or more of the foregoing embodiments.

Based on the foregoing embodiments, an embodiment of this application further provides an electronic device. The electronic device includes the foregoing communications interface, so that the electronic device can implement the retransmission control method provided in any one or more of the foregoing embodiments.

Based on the foregoing embodiments, an embodiment of this application further provides a computer storage medium. The storage medium stores a computer instruction. When the computer instruction is read and executed by one or more processors, the retransmission control method provided in any one or more of the foregoing embodiments may be implemented. The computer storage medium may include any medium that can store program code or a computer instruction, such as a USB flash drive, a removable hard disk, a read-only memory, a random access memory, a magnetic disk, or an optical disc.

Based on the foregoing embodiments, this application provides a computer program product. The computer program product includes a computer instruction. When the computer instruction is executed by a processor, the processor is enabled to perform the retransmission control method provided in any one or more of the foregoing embodiments.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

Definitely, a person skilled in the art can make various modifications and variations to this application without departing from the scope of this application. This application is intended to cover these modifications and variations of this application provided that they fall within the scope of protection defined by the following claims and their equivalent technologies.

What is claimed is:
1. A retransmission control method, comprising:
transmitting, by a transmit end, a first data packet to a receive end; and
when the transmit end does not receive an acknowledgement corresponding to the first data packet within a first retransmission timeout time (RTO), wherein the acknowledgement indicates that the receive end has received the first data packet, performing the following operations:

retransmitting, by the transmit end, the first data packet, and calculating a second RTO based on a receive timestamp of the acknowledgement corresponding to the first data packet and a transmit timestamp of the first data packet; and transmitting, by the transmit end, a second data packet based on the second RTO, wherein the second data packet is transmitted by the transmit end after transmitting the first data packet, wherein the transmitting of the second data packet based on the second RTO comprises:

when the transmit end does not receive an acknowledgement corresponding to the second data packet within the first RTO, retransmitting, by the transmit end, the second data packet; and when the transmit end does not receive the acknowledgement corresponding to the second data packet that has been retransmitted within the second RTO, retransmitting, by the transmit end, the second data packet again;

when the transmit end receives the acknowledgement corresponding to the second data packet within the first RTO, updating, by the transmit end, the first RTO based on a transmit timestamp of the second data packet and a receive timestamp of the acknowledgement corresponding to the second data packet; and when the transmit end does not receive an acknowledgement corresponding to a third data packet within the updated first RTO, retransmitting, by the transmit end, the third data packet, wherein the third data packet is transmitted by the transmit end after transmitting the second data packet.

2. The method according to claim 1, wherein the second RTO is greater than a product of the first RTO and a first coefficient, and wherein a value of the first coefficient is greater than 1.

3. The method according to claim 2, wherein the value of the first coefficient is 2.

4. The method according to claim 1, further comprising:
updating the second RTO based on a receive timestamp of the acknowledgement corresponding to the second data packet and a transmit timestamp of the second data packet; and when the transmit end does not receive an acknowledgement corresponding to the third data packet within the second RTO, retransmitting, by the transmit end, the third data packet, wherein the third data packet is transmitted by the transmit end after transmitting the second data packet.

5. The method according to claim 4, further comprising:
when the transmit end receives the acknowledgement corresponding to the third data packet within the second RTO, updating, by the transmit end, the first RTO based on a transmit timestamp of the third data packet and a receive timestamp of the acknowledgement corresponding to the third data packet; and when the transmit end does not receive an acknowledgement corresponding to a fourth data packet within the updated first RTO, retransmitting, by the transmit end, the fourth data packet, wherein the fourth data packet is transmitted by the transmit end after transmitting the third data packet.

6. The method according to claim 4, further comprising:
updating the second RTO based on a receive timestamp of the acknowledgement corresponding to the third data packet and a transmit timestamp of the third data packet; and when the transmit end does not receive an acknowledgement corresponding to a fourth data packet within the updated second RTO, retransmitting, by the transmit end, the fourth data packet, wherein the fourth data packet is transmitted by the transmit end after transmitting the third data packet.

7. The method according to claim 1, wherein the second RTO represents a time difference between the receive timestamp of the acknowledgement corresponding to the first data packet and the transmit timestamp of the first data packet.

8. The method according to claim 1, wherein the second RTO is a product of a second coefficient and a time difference between the transmit timestamp of the first data packet and the receive timestamp of the acknowledgement corresponding to the first data packet, wherein a value of the second coefficient is greater than 0.

9. The method according to claim 8, wherein the value of the second coefficient is 1.5.

10. The method according to claim 1, wherein the first data packet includes a retransmission sequence number indicating a quantity of times the first data packet has been transmitted, and the acknowledgement corresponding to the first data packet received by the transmit end includes a retransmission sequence number identical to the retransmission sequence number in the first data packet; and the second RTO represents a time difference between the receive timestamp of the acknowledgement corresponding to the first data packet received by the transmit end and the transmit timestamp of the first data packet corresponding to the acknowledgement.

11. The method according to claim 10, wherein the first data packet comprises an extension field to store the retransmission sequence number.

12. The method according to claim 10, wherein the retransmission sequence number is in a token field in the first data packet.

13. The method according to claim 1, wherein the first data packet includes a retransmission sequence number indicating a quantity of times the first data packet has been transmitted, and the acknowledgement corresponding to the first data packet received by the transmit end includes a retransmission sequence number identical to the retransmission sequence number in the first data packet corresponding to the acknowledgement; and the second RTO is a product of a second coefficient and a time difference between the receive timestamp of the acknowledgement received by the transmit end and the transmit timestamp of the first data packet corresponding to the acknowledgement, wherein a value of the second coefficient is greater than 0.

14. A non-transitory computer-readable storage medium, wherein the computer-readable storage medium stores a computer program, and when the computer program is executed by a processor of a transmit end, cause the transmit end to perform operations, the operations comprising:

transmitting a first data packet to a receive end; and when the transmit end does not receive an acknowledgement corresponding to the first data packet within a first retransmission timeout time (RTO), wherein the acknowledgement indicates that the receive end has received the first data packet, performing the following operations:

retransmitting the first data packet, and calculating a second RTO based on a receive timestamp of the acknowledgement corresponding to the first data packet and a transmit timestamp of the first data packet; and transmitting a second data packet based on the second RTO, wherein the second data packet is transmitted by the transmit end after transmitting the first data packet, wherein the transmitting of the second data packet based on the second RTO comprises:

when the transmit end does not receive an acknowledgement corresponding to the second data packet within the first RTO, retransmitting, by the transmit end, the second data packet; and when the transmit end does not receive the acknowledgement corresponding to the second data packet that has been retransmitted within the second RTO, retransmitting, by the transmit end, the second data packet again;

when the transmit end receives the acknowledgement corresponding to the second data packet within the first RTO, updating, by the transmit end, the first RTO based on a transmit timestamp of the second data packet and a receive timestamp of the acknowledgement corresponding to the second data packet; and when the transmit end does not receive an acknowledgement corresponding to a third data packet within the updated first RTO, retransmitting, by the transmit end, the third data packet, wherein the third data packet is transmitted by the transmit end after transmitting the second data packet.

15. A communications interface, comprising:
an input/output (IO) port; and
a processor to:
transmit a first data packet to a receive end through the IO port; and
when the IO port does not receive an acknowledgement corresponding to the first data packet within a first retransmission timeout time (RTO), wherein the acknowledgement indicates that the receive end has received the first data packet, perform the following operations:
retransmitting the first data packet through the IO port, and calculating a second RTO based on a receive timestamp of the acknowledgement corresponding to the first data packet and a transmit timestamp of the first data packet; and
transmitting a second data packet through the IO port based on the second RTO, wherein the second data packet is transmitted after the first data packet is transmitted through the IO port, wherein the transmitting of the second data packet based on the second RTO comprises:
when the IO port does not receive an acknowledgement corresponding to the second data packet within the first RTO, retransmitting the second data packet; and
when the IO port does not receive the acknowledgement corresponding to the second data packet that has been retransmitted within the second RTO, retransmitting the second data packet again;

when the IO port receives the acknowledgement corresponding to the second data packet within the first RTO, update the first RTO based on a transmit timestamp of the second data packet and a receive timestamp of the acknowledgement corresponding to the second data packet; and when the IO port does not receive an acknowledgement corresponding to a third data packet within the updated first RTO, retransmit the third data packet, wherein the third data packet is transmitted after transmitting the second data packet.

16. The communications interface according to claim 15, wherein the second RTO is greater than a product of the first RTO and a first coefficient, and a value of the first coefficient is greater than 1.

17. The communications interface according to claim 15, wherein when the IO port receives the acknowledgement corresponding to the second data packet within the first RTO, the processor is further to:
update the first RTO based on a transmit timestamp of the second data packet and a receive timestamp of the acknowledgement corresponding to the second data packet; and
when the IO port does not receive an acknowledgement corresponding to the third data packet within the updated first RTO, retransmit the third data packet through the IO port, wherein the third data packet is transmitted after the second data packet is transmitted through the IO port.

18. The communications interface according to claim 17, wherein the processor is further to:
when the transmit end receives the acknowledgement corresponding to the third data packet within the second RTO, update the first RTO based on a transmit timestamp of the third data packet and a receive timestamp of the acknowledgement corresponding to the third data packet; and
when the transmit end does not receive an acknowledgement corresponding to a fourth data packet within the updated first RTO, retransmit the fourth data packet, wherein the fourth data packet is transmitted by the transmit end after transmitting the third data packet.

19. The communications interface according to claim 17, wherein the processor is further to:
update the second RTO based on a receive timestamp of the acknowledgement corresponding to the third data packet and a transmit timestamp of the third data packet; and
when the IO port does not receive an acknowledgement corresponding to a fourth data packet within the updated second RTO, retransmitting the fourth data packet, wherein the fourth data packet is transmitted after transmitting the third data packet.

20. The communications interface according to claim 15, wherein the second RTO represents a time difference between the receive timestamp of the acknowledgement corresponding to the first data packet and the transmit timestamp of the first data packet.

* * * * *